(12) United States Patent
Hariri et al.

(10) Patent No.: US 12,718,204 B2
(45) Date of Patent: Aug. 25, 2026

(54) AUTOMATING ACTIONS ACROSS APPLICATIONS

(71) Applicant: Google LLC, Mountain View, CA (US)

(72) Inventors: Behnoosh Hariri, New York, NY (US); Yu Li, New York, NY (US); Gregory George Galante, Little Silver, NJ (US); Christopher Gregory Tong, Long Island, NY (US); Dennis Yung-Chi Hu, Redwood City, CA (US)

(73) Assignee: GOOGLE LLC, Mountain View, CA (US)

( * ) Notice: Subject to any disclaimer, the term of this patent is extended or adjusted under 35 U.S.C. 154(b) by 247 days.

(21) Appl. No.: 18/392,711

(22) Filed: Dec. 21, 2023

(65) Prior Publication Data

US 2025/0209425 A1 Jun. 26, 2025

(51) Int. Cl.

| | |
|---|---|
| ***G06Q 10/00*** | (2026.01) |
| ***G06F 9/00*** | (2018.01) |
| ***G06F 9/54*** | (2006.01) |
| ***G06Q 10/1093*** | (2023.01) |

(52) U.S. Cl.
CPC ......... *G06Q 10/1093* (2013.01); *G06F 9/543* (2013.01)

(58) Field of Classification Search
CPC ...................................................... G06Q 10/00
See application file for complete search history.

(56) References Cited

U.S. PATENT DOCUMENTS

| | | | | |
|---|---|---|---|---|
| 9,824,335 | B1 * | 11/2017 | Vander Mey | G06Q 10/1093 |
| 10,915,584 | B2 | 2/2021 | Chang et al. | |
| 11,836,679 | B2 | 12/2023 | Cupala et al. | |
| 2010/0042704 | A1 * | 2/2010 | Chakra | G06Q 10/109 709/221 |
| 2020/0364305 | A1 * | 11/2020 | Yates | G06F 40/279 |
| 2022/0207489 | A1 | 6/2022 | Gupta et al. | |
| 2023/0362294 | A1 * | 11/2023 | Zhou | G06Q 30/0641 |
| 2024/0112142 | A1 * | 4/2024 | Cupala | G06Q 10/1093 |
| 2025/0217774 | A1 * | 7/2025 | Garg | G06Q 10/1093 |

OTHER PUBLICATIONS

International Search Report and Written Opinion for Application No. PCT/US2024/061119, mailed Feb. 20, 2025, 13 pages.
YouTube, Introducing Coda AI: Your New Favorite Work Assistant, https://www.youtube.com/watch?v=bQxXJlrW2SA, retrieved on Jun. 27, 2024, 15 pages.
YouTube, Notion's New Button Feature is a Game-Changer, https://www.youtube.com/watch?v=XX-SHfDagPM, retrieved on Jun. 27, 2024, 19 pages.

* cited by examiner

*Primary Examiner* — Mustafa Iqbal
(74) *Attorney, Agent, or Firm* — DORITY & MANNING P.A.

(57) ABSTRACT

A computer-implemented method for automating actions across applications includes providing a user interface of an object within a first application to a user computing system. The method further includes receiving an input from the user computing system via the user interface, where the input is associated with requesting an action to be taken with a second application, and where the action uses content associated with the object of the first application. Additionally, the method includes performing the action with the second application based at least in part on the input being received.

20 Claims, 13 Drawing Sheets

AUTOMATING ACTIONS ACROSS APPLICATIONS

FIELD

The present disclosure relates generally to productivity suites, having a plurality of applications. More particularly, the present disclosure relates to automating actions across such applications, such as across applications of a productivity suite.

BACKGROUND

Productivity suites, such as cloud-based productivity suites, typically include multiple applications for users to create and manage different content, such as documents, presentations, email, calendars, meetings, and/or the like. In some instances, the applications allow for multiple users to collaboratively create and manage the different content. Many projects are planned and accomplished across the different applications within productivity suites, and sometimes additional applications outside of the productivity suite. To plan the project and accomplish tasks for the project, users often need to manually look up data by switching between different applications. However, such switching between different applications is often repetitive, time-consuming, and inefficient in both computing-power and workflow productivity.

As such, systems and methods for automating actions across applications, such as different applications of a productivity suite, that reduce or eliminate such switching events would be beneficial in the technology.

SUMMARY

Aspects and advantages of embodiments of the present disclosure will be set forth in part in the following description, or can be learned from the description, or can be learned through practice of the embodiments.

One example aspect of the present disclosure is directed to a computing system for automating actions across applications. For instance, the computing system may include one or more processors, and one or more non-transitory computer-readable media that collectively store instructions that, when executed by the one or more processors, cause the computing system to perform operations. The operations may include providing a user interface of an object within a first application to a user computing system. The operations may further include receiving an input from the user computing system via the user interface, with the input being associated with requesting an action to be taken with a second application, and with the action using content associated with the object within the first application. Additionally, the operations may include performing the action with the second application based at least in part on the input being received.

Another example aspect of the present disclosure is directed to a computer-implemented method for automating actions across applications. The method may include providing, by a computing system, a user interface of an object within a first application to a user computing system. The method may further include receiving, by the computing system, an input from the user computing system via the user interface, where the input may be associated with requesting an action to be taken with a second application, and where the action may use content associated with the object within the first application. Additionally, the method may include performing, by the computing system, the action with the second application based at least in part on the input being received.

Another example aspect of the present disclosure is directed to one or more non-transitory computer-readable media that collectively store instructions that, when executed by one or more computing devices, cause the one or more computing devices to perform operations. The operations may include providing a user interface of an object within a first application to a user computing system. The operations may further include receiving an input from the user computing system via the user interface, with the input being associated with requesting an action to be taken with a second application, and with the action using content associated with the object within the first application. Additionally, the operations may include performing the action with the second application based at least in part on the input being received.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
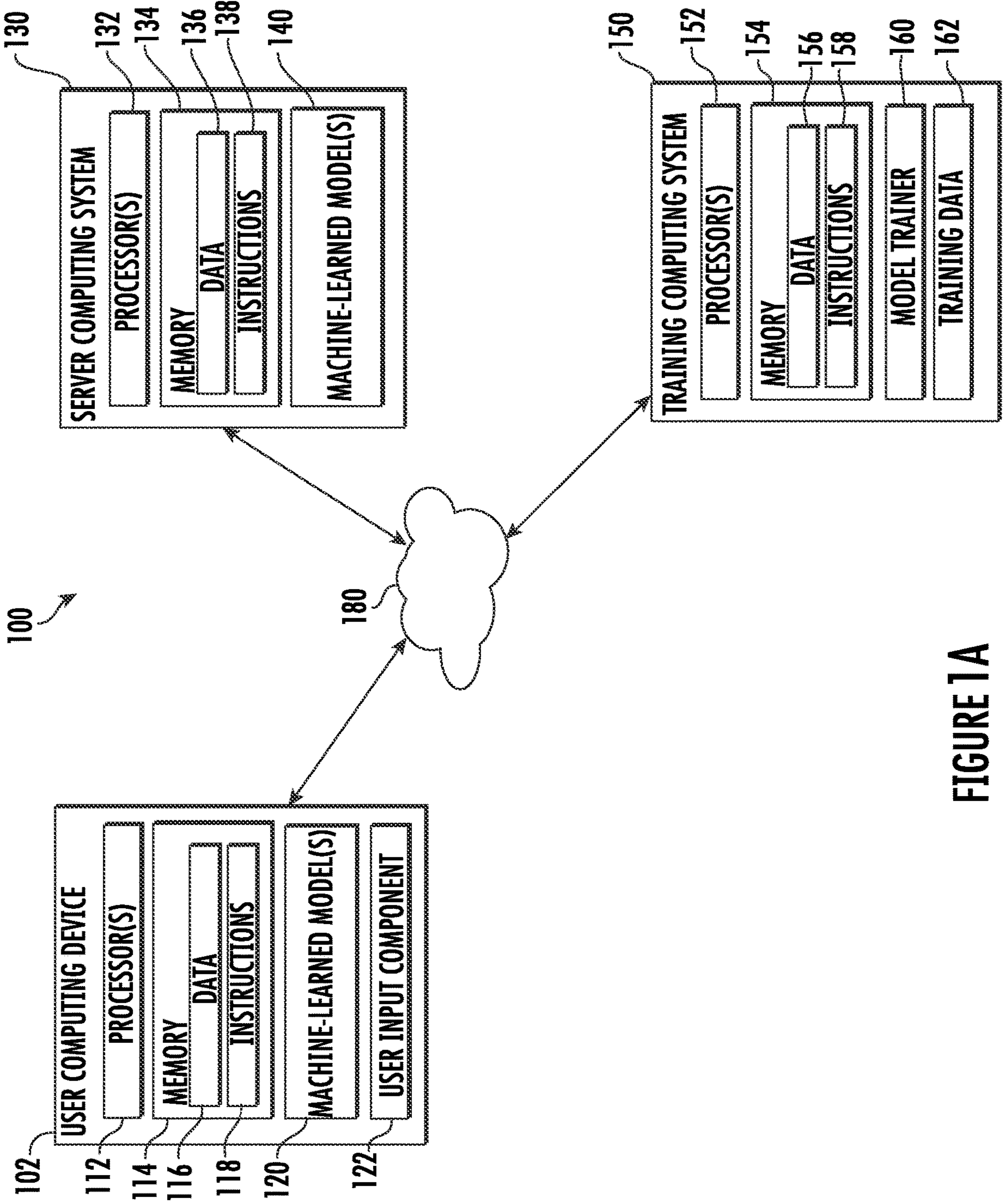
FIG. 1A depicts a block diagram of an example computing system for automating actions across applications according to example embodiments of the present disclosure.

Reference numerals that are repeated across plural figures are intended to identify the same features in various implementations.

DETAILED DESCRIPTION

Overview

Generally, the present disclosure is directed to systems and methods for automating actions across applications, such as across different applications of a productivity suite. More particularly, the systems and methods disclosed herein optimize and automate aspects of performing different tasks across applications that would traditionally require a user to switch back and forth between different applications to perform the tasks. As an example, a computing system can obtain an action request from a user from within a first application, such as from a user interface of a file or object within a first application of a productivity suite. The action request includes information included in the first application and indicates a second application, such as a second application of the same productivity suite or outside of such productivity suite, to be used to automatically perform the action. For instance, the first application may be a word-processing application having a collaborative generation document environment accessible and/or editable by multiple users, where the action request may be to send updates (e.g., using an email application), to schedule a meeting (e.g., using a calendar application), to start a meeting or open a conversation or chat (e.g., using a virtual communication application), and/or the like with the other users of the collaborative generation environment. Similarly, in some instances, the action request may be to share the collaborative generation environment (e.g., using an email application, a calendar application, and/or the like) as meeting notes with participants of a relevant meeting (e.g., based on editing timestamps and scheduled meeting times, meeting title, and/or the like). In response, the second application may be used to automatically perform such action without a user having to navigate away from the first application (e.g., to the second application) or provide a further input. It should be appreciated that the first application may be any other suitable type of application, such as an email application, a calendar application, a virtual meeting application, a photo application, a slide deck application, and/or the like having any suitable, corresponding object type, such as an email, a calendar event, a calendar invite, a meeting, a photo, a slide deck, and/or the like, and that the second application (s) may similarly be any other suitable type of application or combination of applications. Moreover, it should be appreciated that action requests may be predefined by the productivity suite or by a user within the productivity suite, and/or may be a freeform input by a user interacting with an application of the productivity suite.

Aspects of the present disclosure provide a number of technical effects and benefits. As one example technical effect and benefit, users of conventional productivity suites, and/or combinations of applications external to productivity suites, often must spend substantial quantities of time and effort navigating between the development environments of the different applications to accomplish tasks. However, by optimizing across different applications, implementations of the present disclosure can substantially reduce the time required by users. In turn, this eliminates the expenditure of substantial quantities of computer resources that a user would otherwise use (e.g., compute cycles, power, memory, etc.). Further, by reducing the time expense of users, implementations of the present disclosure can increase efficiency across a number of use-cases (e.g., software engineering, medical research, citing documents for research papers, etc.).

With reference now to the Figures, example embodiments of the present disclosure will be discussed in further detail.

Example Devices and Systems

FIG. 1A depicts a block diagram of an example computing system 100 for automating actions across applications of a productivity suite according to example embodiments of the present disclosure. The system 100 includes one or more user computing devices 102, a server computing system 130, and a training computing system 150 that are communicatively coupled over a network 180.

The user computing device(s) 102 can be any type of computing device(s), such as, for example, a personal computing device(s) (e.g., laptop or desktop), a mobile computing device(s) (e.g., smartphone or tablet), a gaming console(s) or controller(s), a wearable computing device(s), an embedded computing device(s), or any other type of computing device(s).

The user computing device(s) 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device(s) 102 to perform operations.

In some implementations, the user computing device(s) 102 can store or include one or more models 120. For example, the models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example models 120 are discussed with reference to FIGS. 1B-8C.

In some implementations, the one or more models 120 can be received from the server computing system 130 over network 180, stored in the user computing device memory 114, and then used or otherwise implemented by the one or more processors 112. In some implementations, the user computing device(s) 102 can implement multiple parallel instances of a single model 120 (e.g., to perform parallel actions across multiple instances of automated action requests).

More particularly, the generative model 120 can be trained to process an automated action request received from a first application and automatically perform such requested action(s) with a second application(s). The applications may be part of a productivity suite, for instance, such that they may be configured to share data across the applications easily, such as without substantial reformatting, without additional permission requests, and/or the like. However, in some instances, the applications may not be from the same productivity suite. The action requests may include content from the first application (e.g., title, authorized users, timestamp(s), edited content, and/or the like) and an action based on the content from the first application (e.g., send an email, send a meeting request, start a meeting, start a chat, link to an event, and/or the like). In some instances, the action request may further define the second application(s) (e.g., an email application, a calendar application, a virtual meeting application, and/or the like) or may be inferred from the action request. Generally, the content of the action request is provided to the generative model 120 in text (e.g., structured and/or freeform), and/or other types of content. The generative model 120 can thus include a large language model, and/or the like. In some implementations, the language model can additionally be utilized for action request autocompletion, action request template generation, and/or the like during the action request crafting process.

Additionally, or alternatively, one or more models 140 can be included in or otherwise stored and implemented by the server computing system 130 that communicates with the user computing device(s) 102 according to a client-server relationship. For example, the models 140 can be implemented by the server computing system 130 as a portion of a web service (e.g., a productivity suite service). Thus, one or more models 120 can be stored and implemented at the user computing device(s) 102 and/or one or more models 140 can be stored and implemented at the server computing system 130.

The user computing device(s) 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more models 140. For example, the models 140 can be or can otherwise include various machine-learned models. Example machine-learned models include neural networks or other multi-layer nonlinear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 2-8.

The user computing device(s) 102 and/or the server computing system 130 can train the model(s) 120, 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned model(s) 120, 140 stored at the user computing device(s) 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the model(s) 120, 140 based on a set of training data 162. The training data 162 can include, for example, example application types, example actions, example action request freeform inputs, example action request structured (e.g., template) inputs, and/or the like.

In some implementations, if the user has provided consent, the training examples can be provided by the user computing device(s) 102. Thus, in such implementations, the model 120 provided to the user computing device(s) 102 can be trained by the training computing system 150 on user-specific data received from the user computing device(s) 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a semantic intent output. As another example, the machine-learned model(s) can process the speech data to generate a prediction output.

FIG. 1A illustrates one example computing system that can be used to implement the present disclosure. Other computing systems can be used as well. For example, in some implementations, the user computing device(s) 102 can include the model trainer 160 and the training dataset 162. In such implementations, the models 120 can be both trained and used locally at the user computing device(s) 102. In some of such implementations, the user computing device(s) 102 can implement the model trainer 160 to personalize the models 120 based on user-specific data.

Figure 1B:
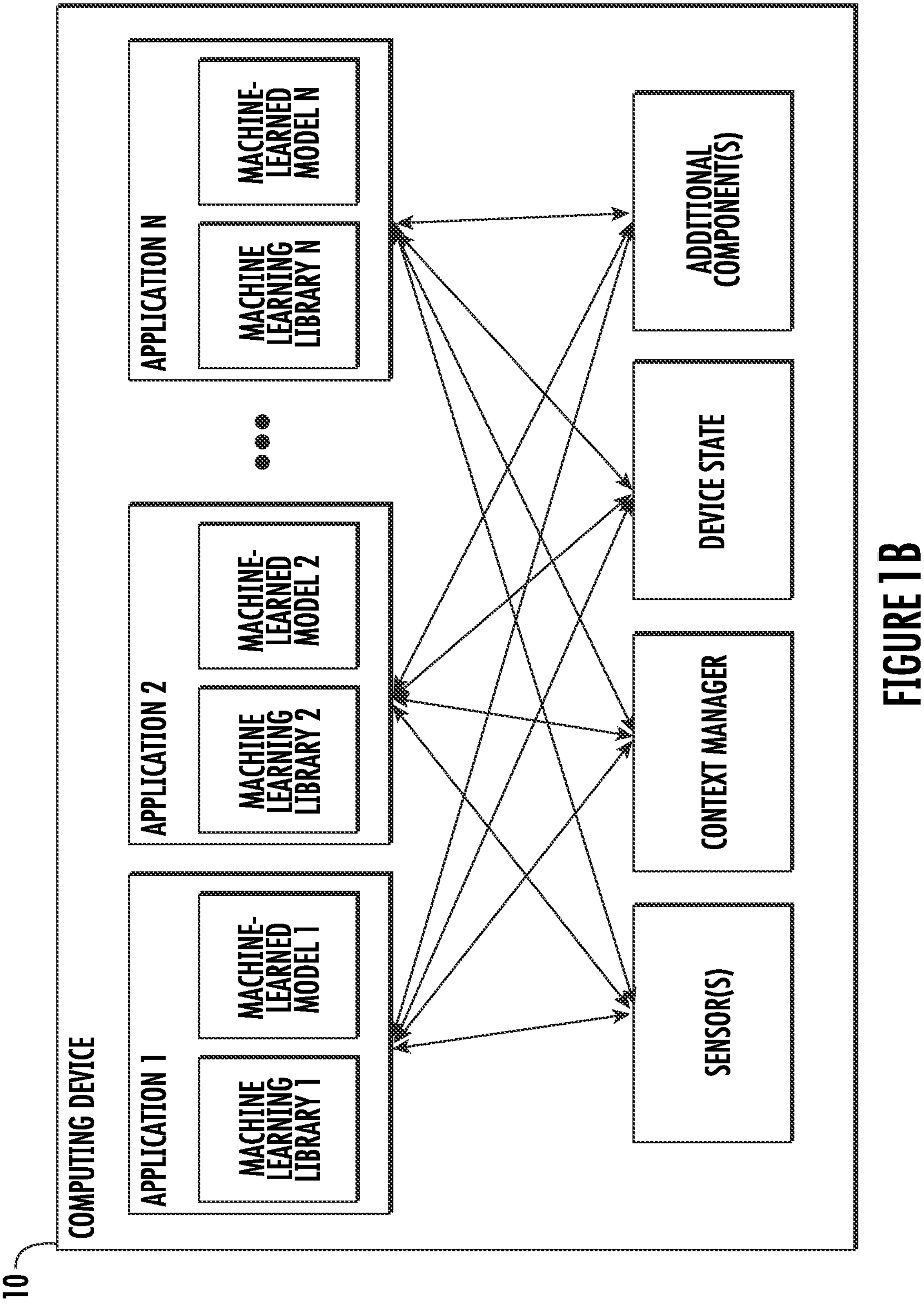
FIG. 1B depicts a block diagram of an example computing device for automating actions across applications according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
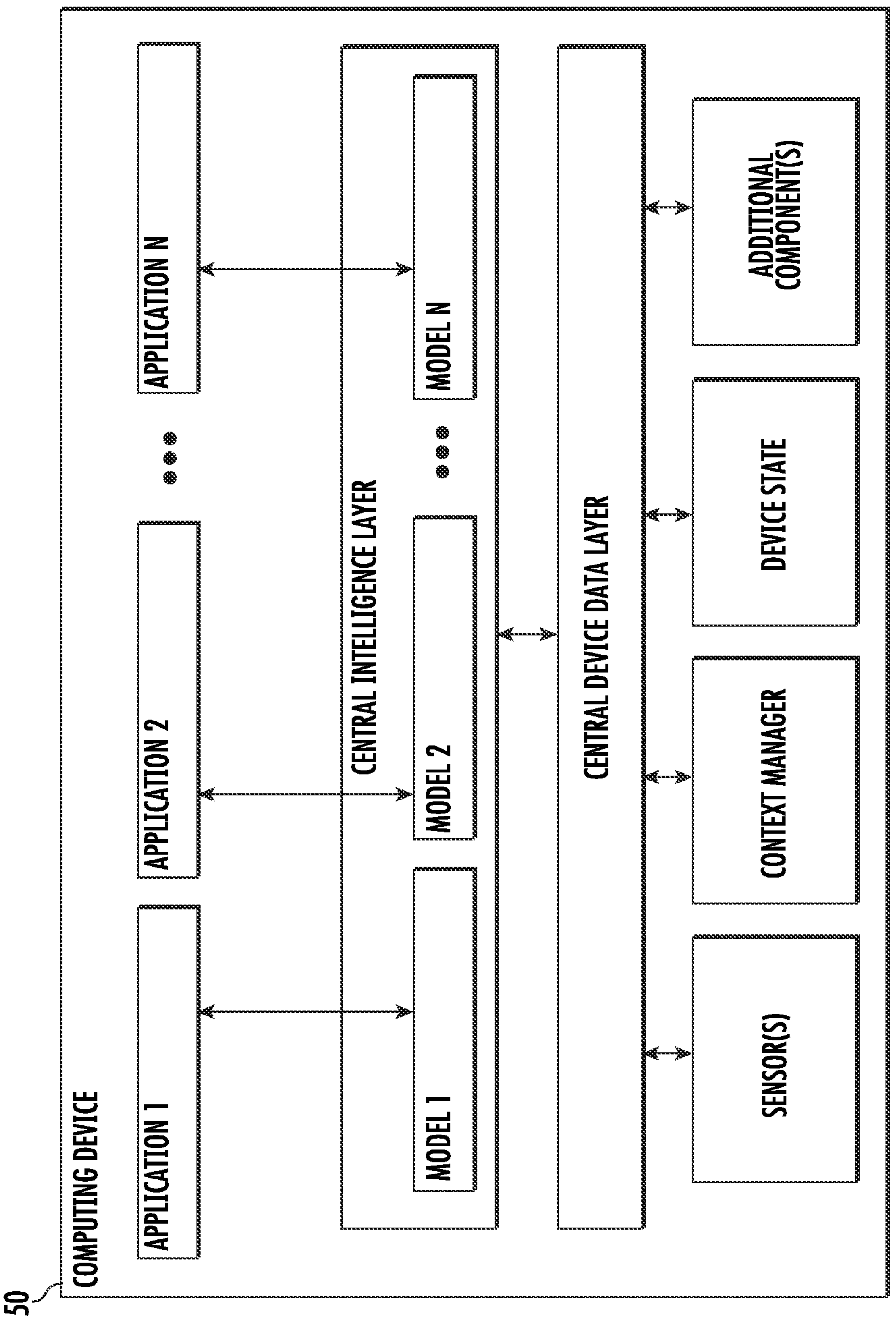
FIG. 1C depicts a block diagram of an example computing device for automating actions across applications according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
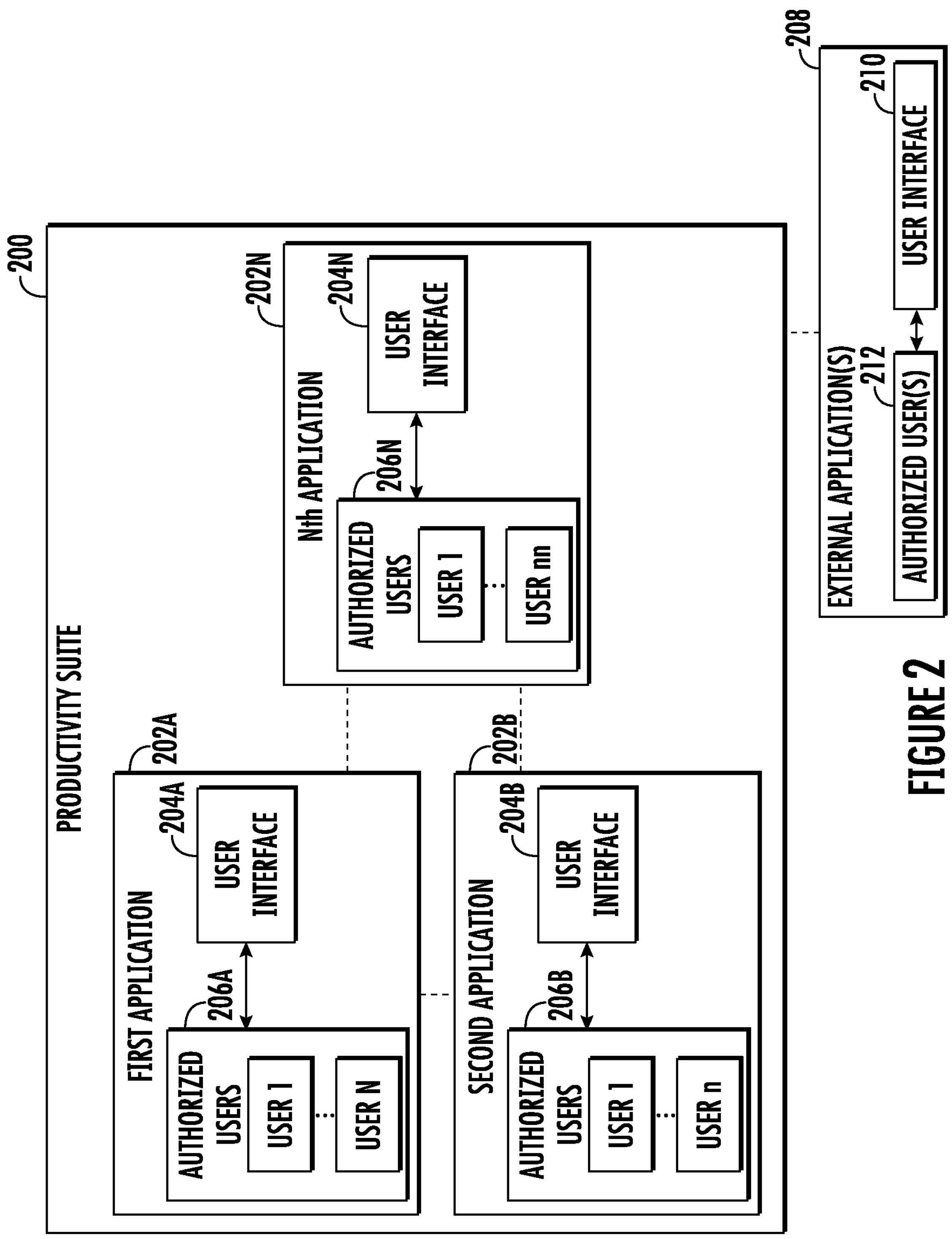
FIG. 2 depicts a block diagram of an example system of a productivity suite according to example embodiments of the present disclosure.

FIG. 2 depicts a block diagram of an example system of a productivity suite 200 according to example embodiments of the present disclosure. In particular, the productivity suite 200 may include or host a plurality of applications, such as a first application 202A, a second application 202B, and so on through a suitable number (Nth) application 202N, where the different applications may be connected to allow data to be shared. For instance, the productivity suite 200 may allow the different applications 202A, 202B, 202N to share information without significant additional permissions and/or without significant additional steps by a user(s) (e.g., data reformatting, and/or the like). In general, such productivity suites, such as the productivity suite 200, may be downloaded onto and run on personal computing devices (e.g., user computing device(s) 102 in FIG. 1, and/or any other suitable user computing device(s)), may be cloud or internet-based and run on a server computing device(s) (e.g., server computing device 130 in FIG. 1, and/or another server based computing device(s)), and/or may be a combination of downloaded and cloud or internet-based. The productivity suite 200 may include any suitable combination of applications, such as a word-processing application, an email application, a calendar application, a virtual meeting application, a photo application, and/or the like. Each of the applications 202A, 202B, 202N of the productivity suite 200 may have a respective user interface 204A, 204B, 204N allowing authorized users 206A, 206B, 206N to create, access, edit, and/or the like content within the application. In some instances, one or more of the applications 202A, 202B, 202N particularly allow for collaborative files or objects, such as documents, slide decks, emails, calendar events, and/or the like, in which content is accessible and/or editable by multiple authorized users 206A, 206B, 206N. For instance, a first set of authorized users 206A (e.g., User 1 through User N) may be allowed to access and/or edit content within the generative environment of the first application 202A, a second set of authorized users 206B (e.g., User 1 through User n) may be allowed to access and/or edit content within the generative environment of the second application 202B, and another set of authorized users 206N (e.g., User 1 through User nn) may be allowed to access and/or edit content within the generative environment of the Nth application 202N. In some instances, one or more of the applications 202A, 202B, 202N particularly allow for shared, separately accessible content. For instance, a first set of authorized users 206A (e.g., User 1 through User N) may be allowed to create and/or edit content within the first application 202A and share such content with other users for viewing and/or separately editing, a second set of authorized users 206B (e.g., User 1 through User n) may be allowed to create and/or edit content within the second application 202B and share such content with other users for viewing and/or separately editing, and another set of authorized users 206N (e.g., User 1 through User nn) may be allowed to create and/or edit content within the Nth application 202N and share such content with other users for viewing and/or separately editing. For example, a user may create a calendar event with one of the applications 202, which may then be shared with one or more other users, where the one or more other users may access the calendar event and, if given permission, make or suggest changes to such event.

In some instances, the productivity suite 200 may be in communication with one or more external applications 208, outside of the productivity suite. In general, the external application(s) 208 may similarly be any suitable type of application or combination of applications (such as a word-processing application, an email application, a calendar application, a virtual meeting application, a photo application, and/or the like) that is not necessarily optimized to communicate with the applications of the productivity suite. For instance, the external application(s) 208 may be created by a different party than the one that created or hosts the productivity suite 200, may have been created using a different platform than the one used for the productivity suite 200, may be optimized for different devices than for the productivity suite 200, and/or the like. The external application(s) 208 may similarly be configured to provide a user interface 210 to allow authorized users (e.g., authorized users 212) for the external application(s) 208 to create, access, edit, and/or the like content within the external application(s) 208. In some instances, the external application(s) 208 may also support collaborative generation or development environments, in which content is accessible and/or editable by multiple authorized users for the external application(s) 208.

As will be described in greater detail below, users must often switch between different applications to accomplish tasks. For instance, a user may start in a first application to perform a first task and then switch to another application to perform a second task based on the first task or something else in the first application. The following are examples of different scenarios that require a user to switch between applications.

For example, a user (e.g., User 1) working within a collaborative generation environment of an object within the first application 202A (e.g., a document within a word-processing application) may need to switch over to another application (e.g., the second application 202B and/or the external application 208 as an email or chat application) to send a message to or start a conversation with the other authorized users (e.g., User N) of the collaborative generation environment within the first application 202A, such as to ask the other authorized users to review the updates of the content within the collaborative generation environment of the first application 202A.

Similarly, in another example, the user (e.g., User 1) working within a collaborative generation environment of an object within the first application 202A (e.g., a document within a word-processing application) may need to switch over to another application (e.g., the second application 202B and/or the external application 208 as a calendar application) to send a meeting invite to the other authorized users (e.g., User N) of the collaborative generation environment within the first application 202A to discuss updates of the content within the collaborative generation environment of the first application 202A.

In a further example, the user (e.g., User 1) working within a collaborative generation environment of an object within the first application 202A (e.g., a document within a word-processing application) may need to switch over to the another application (e.g., the second application 202B and/or the external application 208 as a virtual meeting application) in order to create or open a virtual meeting space (e.g., a chat, a virtual call, a video conference, and/or the like) with the other authorized users (e.g., User N) of the collaborative generation environment within the first application 202A.

In yet another example, the user (e.g., User 1) working within a collaborative generation environment of an object within the first application 202A (e.g., a document within a word-processing application) may need to switch over to another application (e.g., the second application 202B and/or the external application 208 as a calendar application) to identify other users that may need to be added as authorized users to the collaborative generation environment within the first application 202A, such as other users on a meeting invite, before switching back to the first application 202A to add the other users as additional authorized users or to another application (e.g., the Nth application and/or the external application 208 as an email or chat application) to send the collaborative generation environment to the other users.

It should be appreciated that while the examples provided above originate with the user having to switch from an object within the first application 202A, the user may also have to switch from objects of any other starting application. Moreover, it should be appreciated that the user may have to individually select or add the other authorized users, one at a time, to the email, conversation, meeting invitation, and/or the like, which may be time consuming, and require further cross-referencing to confirm that all of the necessary ones of the authorized users have been added.

Additionally, users may need to perform the same set of tasks across different projects. For instance, when performing projects of a same type, there may be a plurality of steps that must take place at a certain stage that requires a user to perform the same inputs. For example, at the start of a project, the user may have to share a project overview, set up and share a set list of tasks based on the project overview, schedule an initial project launch meeting, open a chat space for the project, and/or schedule a regular follow up meeting. Later, during a review stage, a user may have to create and share a review rubric, schedule a review meeting, and/or the like. Further, after the review stage, the user may need to share the project with another team, which could require the user to individually click through each project document, chat space, and/or the like to share the project with the other team. A user could create templates for each of the tasks, but this would still require a user to find the individual templates and send them for each project.

Generally, switching back and forth is time consuming, as users must often spend substantial quantities of time and effort navigating between the development environments of the different applications to accomplish tasks, where the tasks may be simple, yet repetitive. Such switching back and forth between applications also wastes substantial quantities of computer resources (e.g., compute cycles, power, memory, etc.).

Figure 3:
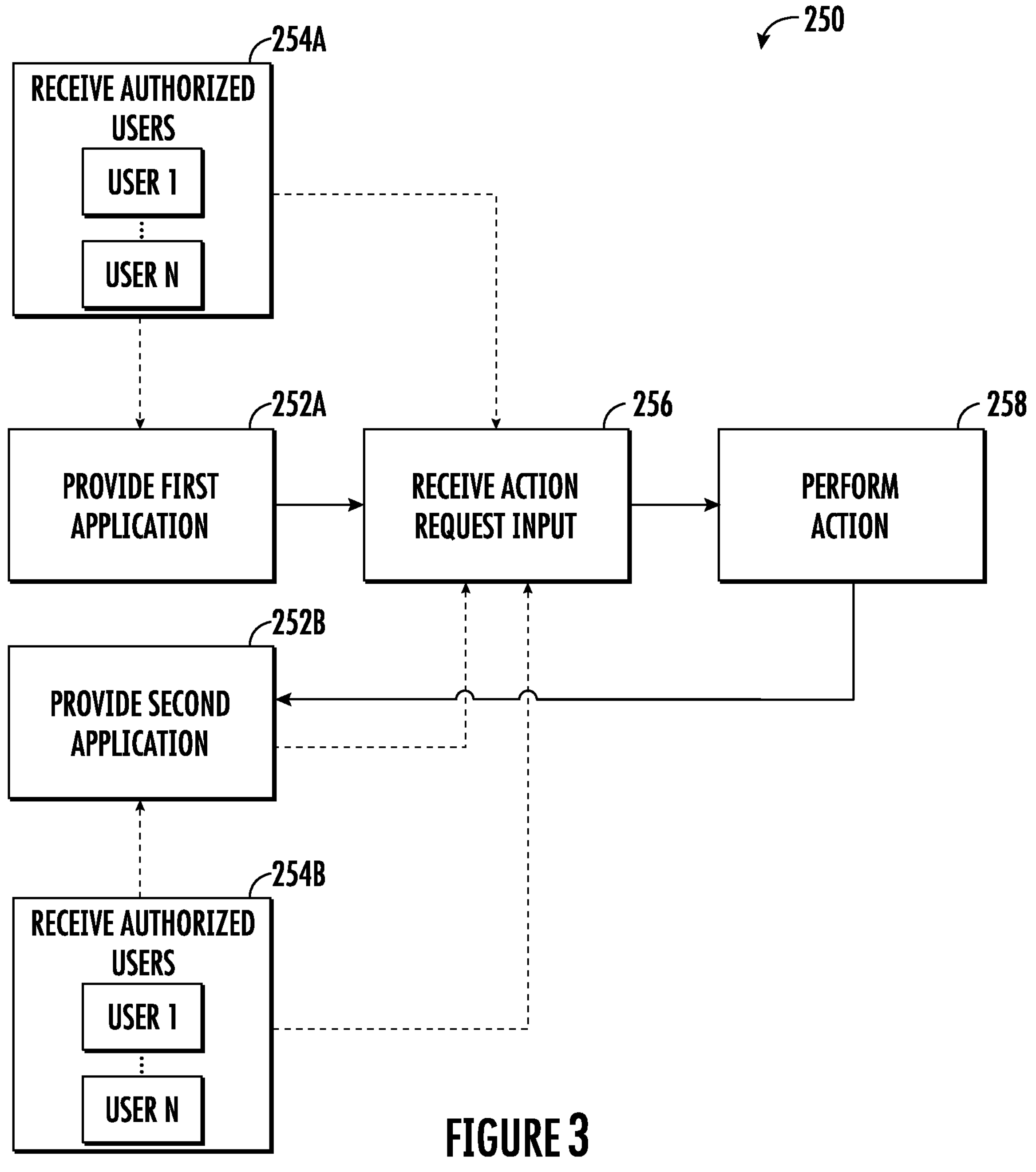
FIG. 3 depicts a block diagram of an example for automating actions across applications according to example embodiments of the present disclosure.

As such, a block diagram of an example model 250 for automating actions across applications, such as across different applications of a productivity suite, is described with reference to FIG. 3. It should be appreciated that the model 250 may be implemented by the productivity suite 200, such as by a server computing system hosting the productivity suite. However, in some instances, the system(s) that implements the model 250 is external to the productivity suite, but in communication with the productivity suite and any external applications. As shown in FIG. 3, a first step of the model 250 includes providing at least a first application at step 252A. For instance, providing a first application includes providing a user interface (e.g., user interface 204A in FIG. 2) of a first application (e.g., of the first application 202A in FIG. 2) to a user computing system (e.g., one of the user computing device(s) 102 in FIG. 1A). In one instance, one or more inputs 254A may be received through an object (e.g., a document file) of the first application via the user interface (e.g., user interface 204A in FIG. 2) of the first application indicative of authorized users (e.g., authorized users 206A in FIG. 2) for accessing and/or editing content within the first application. As further shown in FIG. 3, in some instances, the model 250 may include providing a second application at step 252B. For instance, providing a second application includes providing a user interface (e.g., user interface 204B in FIG. 2) of a second application (e.g., of the second application 202B in FIG. 2) to a user computing system (e.g., one of the user computing device(s) 102 in FIG. 1A). In some instances, one or more inputs 254B may be received through an object of the second application the user interface (e.g., user interface 204B in FIG. 2) of the second application indicative of authorized users (e.g., authorized users 206B in FIG. 2) for accessing and/or editing content within the second application. It should be appreciated that, while the second application is discussed as being the second application 202B in FIG. 2 for example purposes, the second application may be any other application(s) within the productivity suite and/or an application outside of the productivity suite (e.g., external application 208 in FIG. 2). If the second application is an external application 208, providing the second application may include receiving permissions for communicating with, sharing content with, and/or allowing control by a productivity suite, such as one or more applications of the productivity suite (e.g., the first application 202A, and/or the like).

The model 250 may then include receiving an action request input at step 256. The action request may be received via the user interface of the first application (e.g., the user interface 204A in FIG. 2). In some instances, the action request input is a single click on a button, where the button is associated with a predefined action. In one instance, the action request input is a series of selections (e.g., drop-down selections, multiple choice selections, and/or the like). In one or more instances, the action request input is a freeform text input, which may be interpreted using machine-learning. The action request input may indicate an action to be taken (e.g., send an email, schedule a meeting, start a meeting, open a chat, add authorized users, and/or the like). The action request may also indicate one or more second applications (e.g., the second application 202B in FIG. 2) to use to perform the action. In some instances, the action request input may explicitly define the second application to be used (e.g., "use the second application 202B"). In one instance, the action request input may only implicitly define the second application to be used based on the action to be taken (e.g., the second application must be an email application to send an email, a calendar application to schedule a meeting, a virtual meeting application to open a meeting, and/or the like). When the second application is implicitly defined, the model 250 may assume the appropriate application to use from the other applications available in the productivity suite. In some instances, the action request input may also include further context for performing the action. For instance, the action request input may receive an indication of the intended audience for the action (e.g., authorized users within a development environment of the first application, authorized users of a development environment of the second application, and/or the like).

Thereafter, the model 250 may perform the requested action at step 258 based on the action request input received at step 256. For instance, the model 250 may automatically use a second application to perform an action for an intended audience, where the second application, the action, and the intended audience may be defined (explicitly and/or implicitly) in the action request input from step 256. Using the second application to perform an action may include identifying content within the first application to use within the second application and/or another application, or to actually perform an action within the second application or a further application. It should be appreciated that the model 250 allows actions to be initiated across applications without a user having to navigate away from the application the user is working within, which can substantially reduce the time required by users to perform actions across applications. In turn, this eliminates the expenditure of substantial quantities of computer resources that a user would otherwise use (e.g., compute cycles, power, memory, etc.). Further, by reducing the time expense of users, implementations of the present disclosure can increase efficiency across a number of use-cases (e.g., software engineering, medical research, citing documents for research papers, etc.).

FIGS. 4A-8C illustrate different aspects of an example interaction 300 for automating actions across applications according to example embodiments of the present disclosure. For instance, FIGS. 4A-4D depict illustrations of example aspects of a user interface of a first application of a productivity suite, with the first application being used for automating actions across other applications, such as other applications of the productivity suite, according to example embodiments of the present disclosure.

In particular, as shown in FIGS. 4A-4D, in some instances, the first application of the productivity suite may be a word processing application that includes or provides a file or object 302 displayed on a user interface 142, such as a user interface of one of the user computing device(s) 102 of FIG. 1A. The object 302 may be a document having a workspace 304 configured to receive inputs (e.g., content such as text, images, and/or the like) from a user and provide or display such inputs in-line within the workspace 304. It should be appreciated that, as used herein, "in-line" is considered to mean content within or insertable into the workspace 304 such that it is subject to formatting rules of the workspace 304 and/or embedded into the workspace 304. For instance, the object 302 may provide one or more format selection interface elements 306 with which a user may interact for selecting or defining formatting rules (e.g., content level (e.g., heading, subheading, normal body, etc.), font style, font size, font emphasis (e.g., bold, italicize, underline, color, highlight), paragraph style, numbering, bulleting, and/or the like) for content (e.g., text) in-line within the workspace 304. The object 302 may further include a title field for receiving and displaying a title (e.g., "MARKETING DRAFT") for the particular object 302.

Figure 4A:
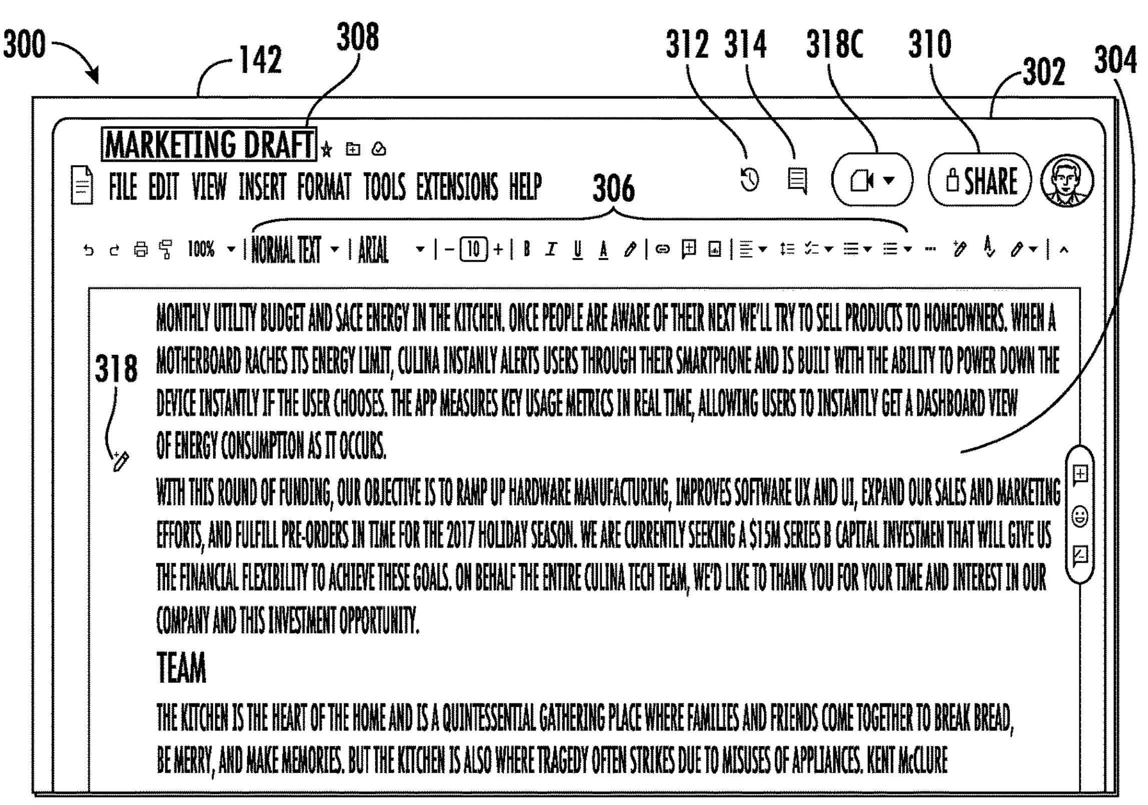
FIGS. 4A-4D depict illustrations of example aspects of a user interface of a first application of a productivity suite, with the first application being used for automating actions across other applications according to example embodiments of the present disclosure.
Figure 4B:
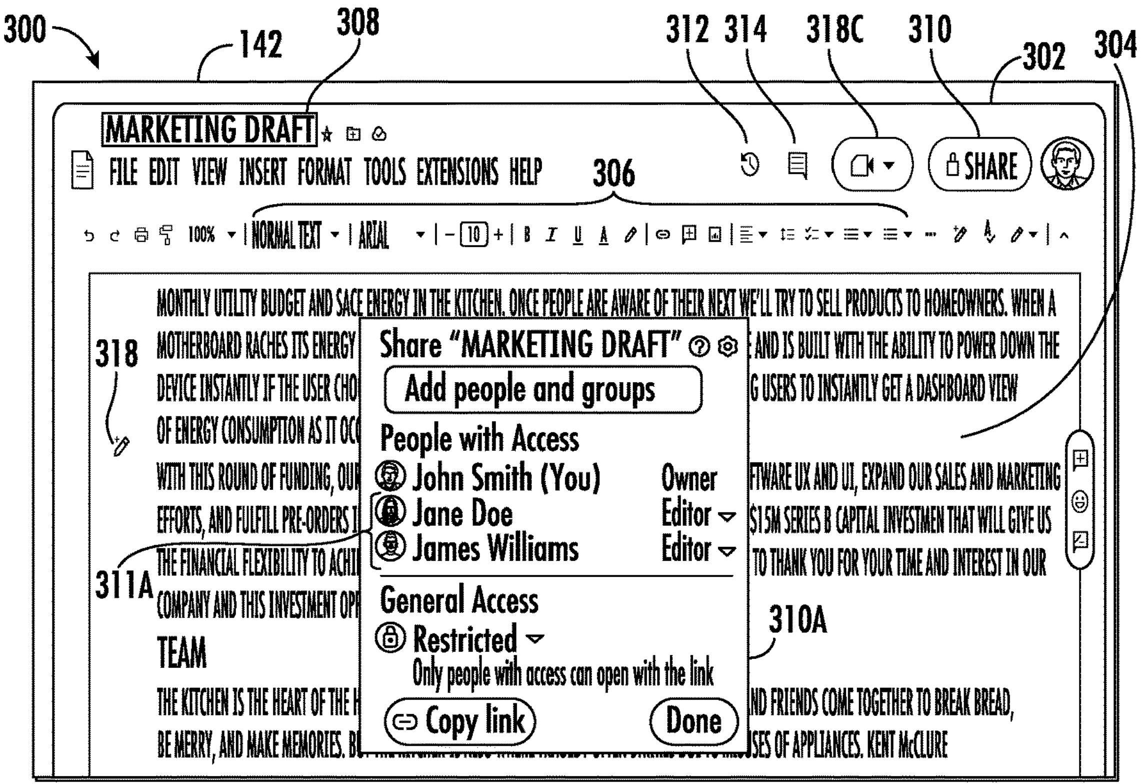

Further, the object 302 is configured as a collaborative integrated development environment, which allows multiple authorized users to access (e.g., view) and/or edit content within the object 302 simultaneously. As such, the object 302 includes a share element 310 (e.g., button, and/or the like) which may be interacted with (e.g., clicked on, hovered over, and/or the like) by a user to view, add, and/or remove other authorized users. For instance, as shown in FIG. 4B, a share window 310A appears after a user (e.g., John Smith) has interacted with the share element 310, where the share window 310A indicates the other authorized users 311A (e.g., Jane Doe and James Williams), the level of authorization of the authorized users (e.g., owner, editor, viewer, and/or the like), a field and/or the like for adding additional authorized users, a share link for sharing the object 302 with authorized users, where the share link may provide different levels of authorization, and/or the like.

Moreover, as shown in FIGS. 4A-4D, the object 302 includes one or more quick actions, where each of the quick actions is associated with a respective action to take within the object 302. The quick actions may be accessible directly from the toolbar above the workspace 304, from a list accessible from a floating icon within the workspace 304, from a list accessible from the toolbar, and/or any other suitable location. For example, a revision history quick action 312 and a comment history quick action 314 are independently accessible from icons displayed directly on the toolbar itself, however, such features may be otherwise accessible from the object 302. In general, when a user interacts with the revision history quick action 312, changes made to the object 302 (e.g., to the content within the workspace 304) by the different authorized users and, optionally, the time at which such change occurred, may be provided (e.g., displayed). Similarly, when a user interacts with the comment history quick action 314, comments made and/or resolved by the different authorized users and, optionally, the time at which comments were made and/or resolved, may be provided (e.g., displayed). It should be appreciated that any other suitable quick actions may be directly accessible from the toolbar.

Figure 4C:
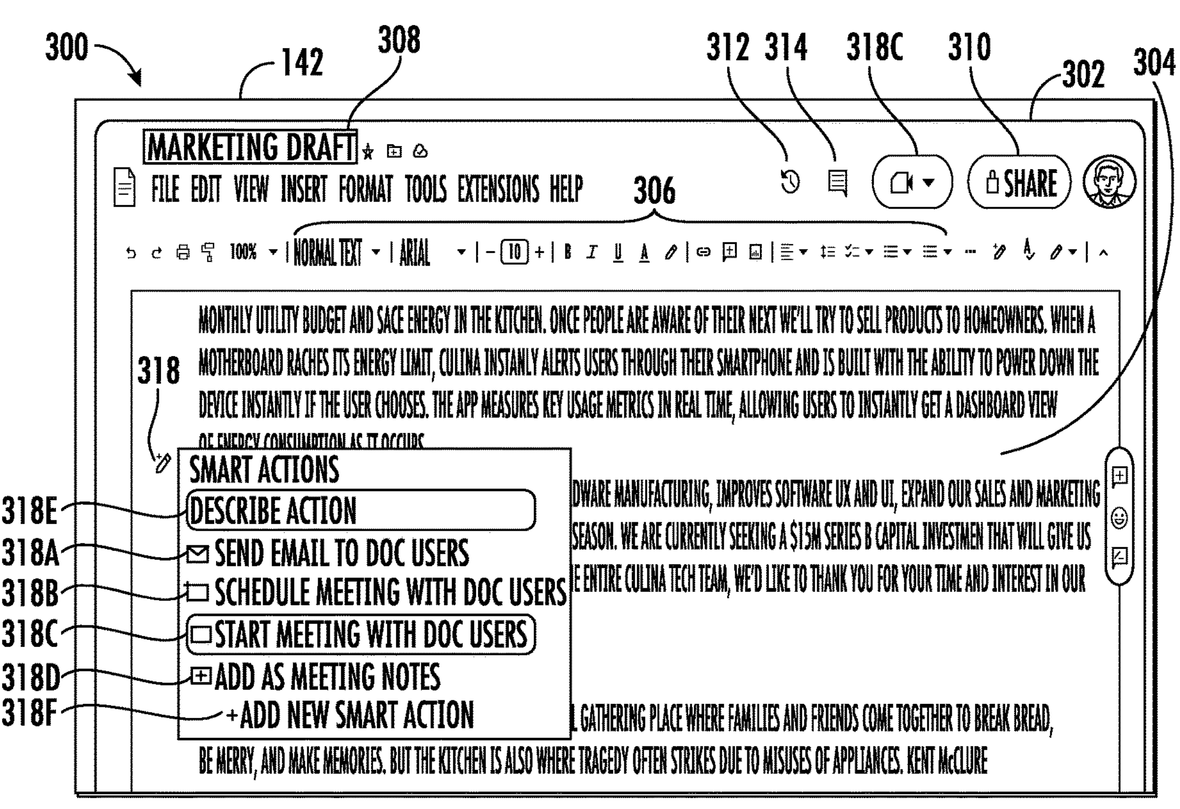
Figure 4D:
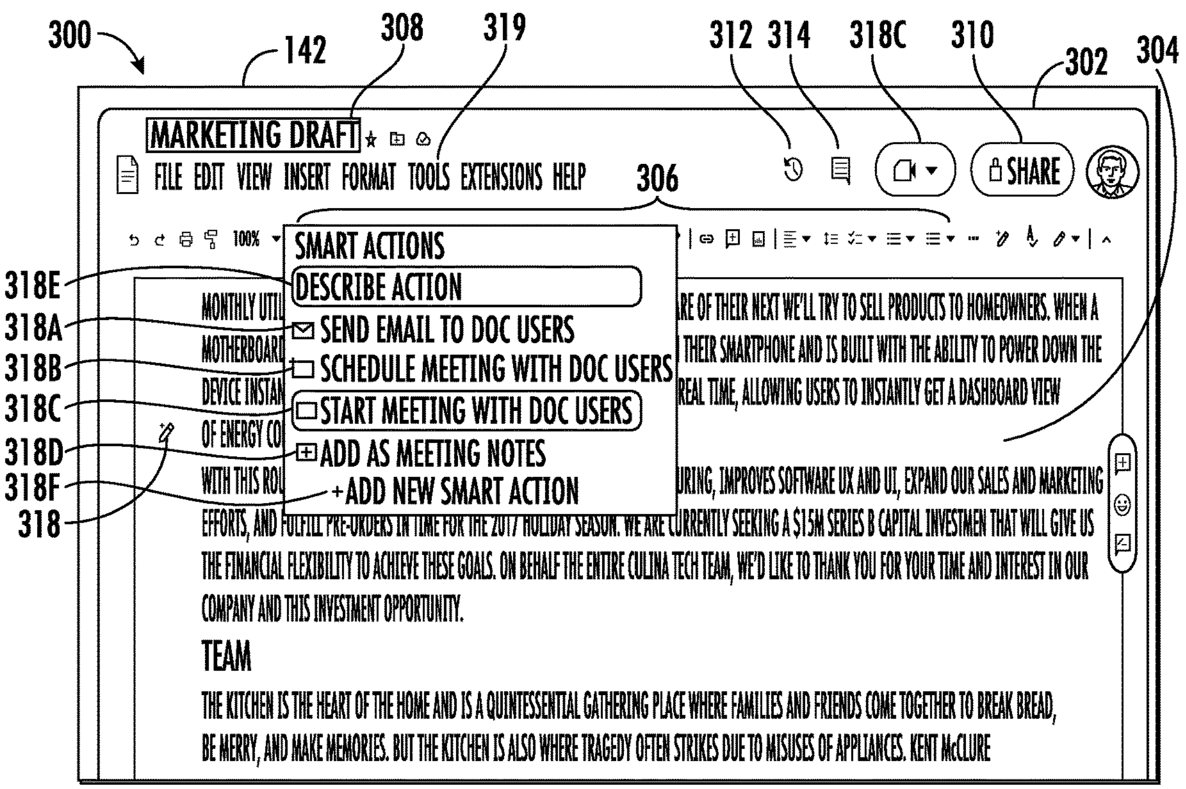

Additionally, the object 302 may include one or more smart actions, where each of the smart actions is associated with a respective action to be performed (at least in part) with another application, other than the first application. Similar to the quick actions, the smart actions may be accessible from the toolbar above the workspace 304, from a list accessible from a floating icon within the workspace 304, from a list accessible from the toolbar, and/or any other suitable location. For example, as shown in FIG. 4C, a list of smart actions is accessible from smart action icon 318. Additionally, or alternatively, the list of smart actions is accessible from a smart actions section under "Tools" 319, as shown in FIG. 4D. The smart actions may identify content from the first application for automatically performing the actions with the second application.

In some instances, one or more of the smart actions is predefined, such that each of the smart actions defines a respective pair of action and an application type or application with which to perform the action. Particularly, each of the smart actions is configured to perform the action(s) across multiple applications based on existing content within the application(s). For instance, the smart actions may be based at least in part on existing authorized users in one or more of the involved applications, a title of one or more of the involved applications, a time and/or timestamp associated with content existing within one or more of the involved applications, and/or the like.

Figure 5:
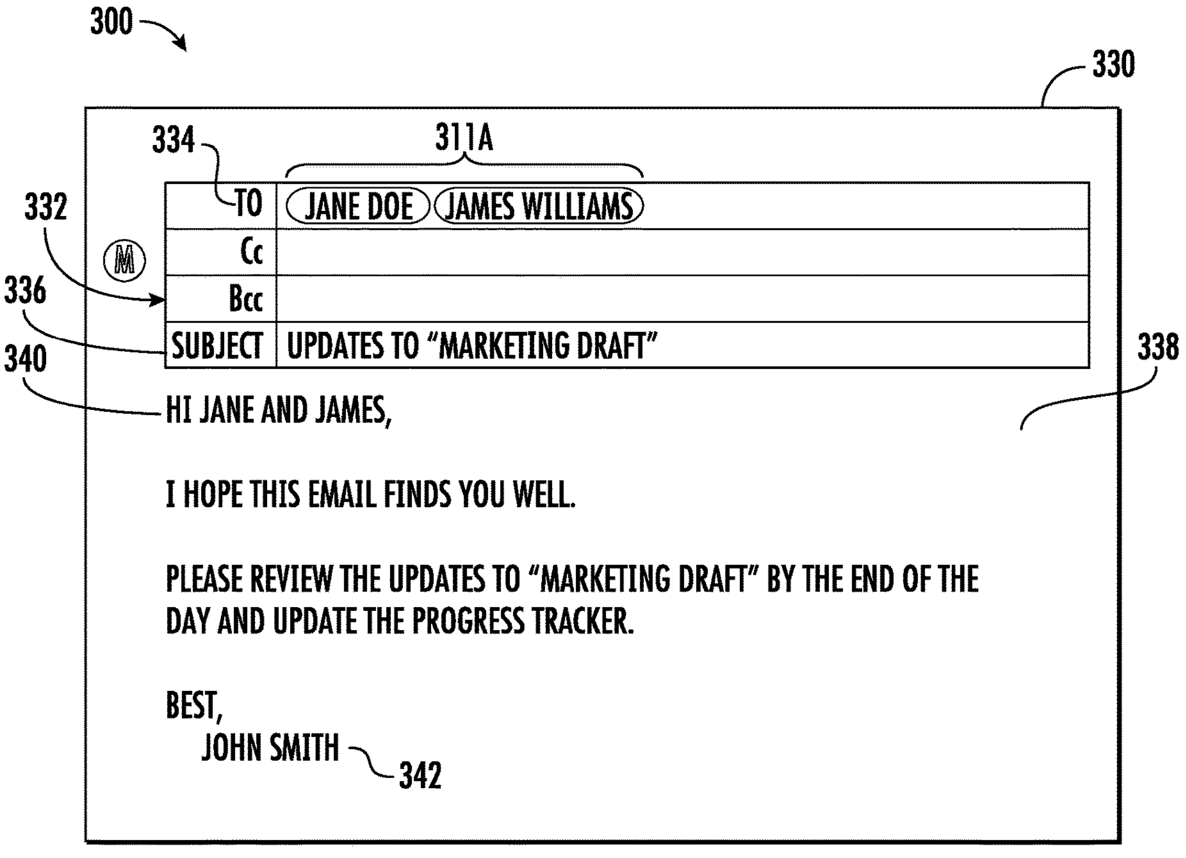
FIG. 5 depicts an illustration of an example email automatically generated and sent with a second application based on an action initiated from the first application of the productivity suite illustrated in FIGS. 4A-4D according to example embodiments of the present disclosure.

For example, the predefined smart actions illustrated include a predefined element, such as a predefined email smart action 318A (e.g., labeled "SEND EMAIL TO DOC USERS" in FIGS. 4C and 4D), which, when interacted with by a user, sends an email to the authorized users (e.g., the authorized users 311A in FIG. 4B). FIG. 5, for instance, depicts an illustration of an example email 330 automatically generated and sent with a second application, such as an email application, based on an action initiated from the first application of the productivity suite illustrated in FIGS. 4A-4D according to example embodiments of the present disclosure. In particular, as shown in FIG. 5, the email 330 includes common fields 332 for an email, such as explicit fields including a "To" field 334, a "Cc" field, a "Bcc" field, a "Subject" field 336, in addition to implicit fields (e.g., body 338 having a greetings line 340, body content, and by-line 342). The email smart action 318A may pull the authorized users from the object 302 of the first application (e.g., the authorized users 311A in FIG. 4B) and insert the authorized users as recipients in the "To" field 334 (e.g., "To: Jane Doe and James Williams") and in the greetings line 340 (e.g., "Hi Jane and James"). In some instances, the email smart action 318A is preconfigured as an update request email, asking for the authorized users to review the content of the object 302 of the first application. As such, the email smart action 318A may pull the title from the object 302 of the first application (e.g., "MARKETING DRAFT" in FIGS. 4A-4D) and insert the title into the "Subject" field 336 (e.g., "Updates to 'MARKETING DRAFT'") and into the body of the template message (e.g., "Please review the updates to 'MARKETING DRAFT' . . . "). Additionally, the email smart action 218A may insert the current user that initiated the smart action (e.g., John Smith from the authorized users 311A in FIG. 4B) in the by-line 342. However, it should be appreciated that the email template may be any other suitable template, having any other suitable messages and/or fields.

For instance, in another example, the predefined email smart action 318A may be configured to identify tasks within the object 302 and the authorized user(s) 311A assigned to each of the tasks, then send an email to the authorized user(s) 311A who still have one or more pending tasks (e.g., task list items that have not been checked off, are marked as "in progress", and/or the like), asking for such authorized user(s) 311A to update their tasks, provide updates on their tasks, and/or the like. As such, the predefined email smart action 318A may, in some instances, use machine-learning to parse content within the object 302 to identify how to implement the requested actions.

After generating the email 330, the email 330 is automatically sent via the email application. Thus, the only user input for generating and sending such email 330 in the email application was the initial interaction with the email smart action 318A from the first application. It should be appreciated that, as the email 330 is automatically sent, without further interaction by the requesting user, the email 330 is not necessarily shown to the user before sending. In some instances, a confirmation of the email 330 being sent is provided to the requesting user. For instance, a pop-up window, a banner, and/or the like may temporarily appear on the user interface of the first application indicating that such email 330 has been sent. In one instance, an "undo" option may be provided with such confirmation. In some embodiments, the email application is part of the same productivity suite (e.g., the productivity suite 200) as the word processing application. However, in some instances, the email application may be external to the productivity suite of the word processing application.

Figure 6A:
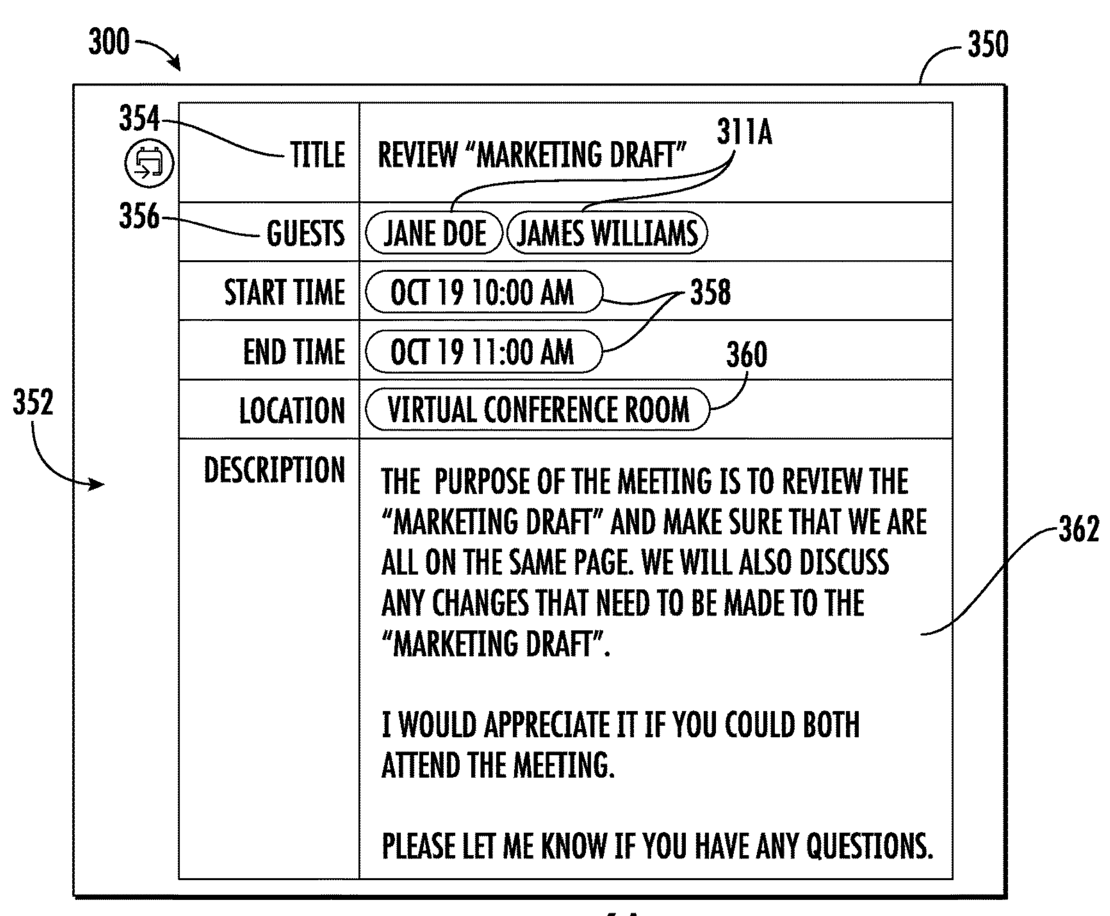
FIGS. 6A-6B depict illustrations of an example meeting automatically generated with a further application based on an action initiated from the first application of the productivity suite illustrated in FIGS. 4A-4D according to example embodiments of the present disclosure.
Figure 6B:
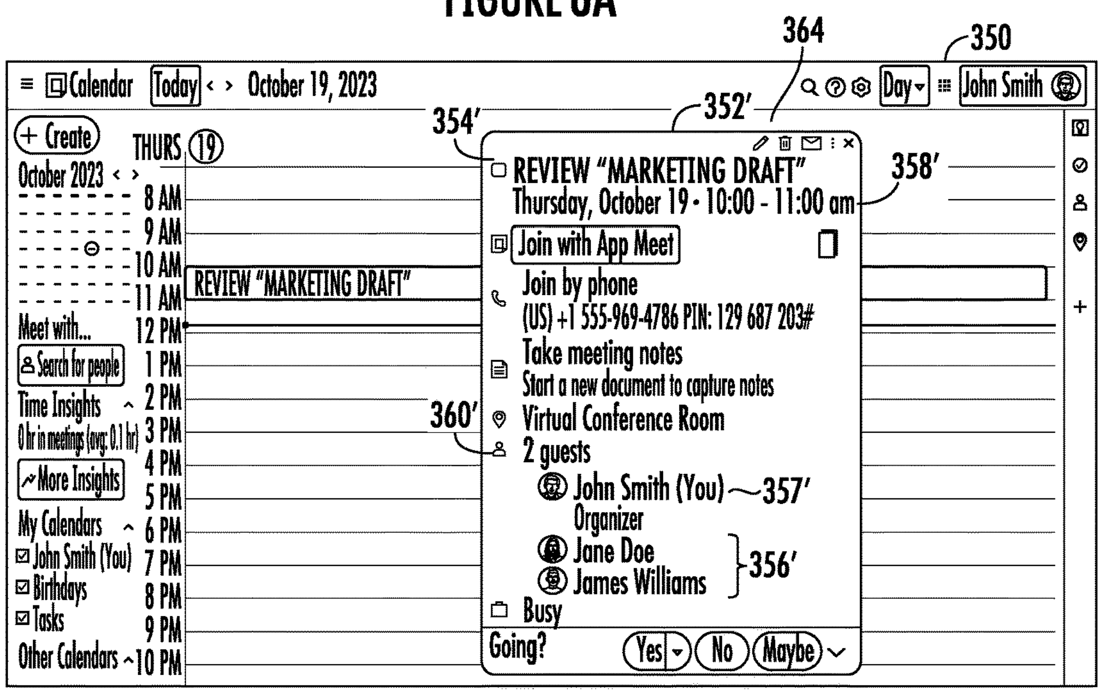

Turning back to FIGS. 4C-4D, another example of a predefined smart action element includes a meeting scheduling smart action 318B (e.g., labeled "SCHEDULE MEETING WITH DOC USERS"), which, when interacted with by a user, sends an invitation for a meeting and/or schedules a meeting with the authorized users (e.g., the authorized users 311A in FIG. 4B). FIGS. 6A-6B, for instance, depict illustrations of an example meeting automatically generated with a further application, such as a calendar application 350, based on an action initiated from the first application (word-processing application) of the productivity suite illustrated in FIGS. 4A-4D according to example embodiments of the present disclosure. More particularly, FIG. 6A illustrates a meeting invitation 352 automatically generated within the calendar application 350 and sent (e.g., such as by the email application) and FIG. 6B illustrates an associated meeting 352' inserted into or scheduled in the calendar application 350.

In particular, as shown in FIG. 6A, the meeting invitation 352 includes common fields for a meeting invitation, such as explicit fields including a meeting "Title" field 354, a meeting "Guests" field 356, a meeting time field(s) 358 (e.g., "Start Time" and "End Time"), a meeting "Location" field 360, and a meeting "Description" field 362. In some instances, the scheduling smart action 318B is preconfigured as a meeting to review the content of the object 302 of the first application. As such, the scheduling smart action 318B may pull the title from the object 302 of the first application (e.g., "MARKETING DRAFT" in FIGS. 4A-4D) and insert the title into the meeting "Title" field 354 (e.g., "Review 'MARKETING DRAFT'") and into the body of the template message (e.g., "The purpose of the meeting is to review the 'MARKETING DRAFT' . . . discuss any changes that need to be made to the 'MARKETING DRAFT' . . . "). Similarly, the scheduling smart action 318B may pull the authorized users from the object 302 of the first application (e.g., the authorized users 310A in FIG. 4B) and insert the authorized users as recipients in the "Guests" field 356 (e.g., "To: Jane Doe and James Williams"). Further, the scheduling smart action 318B may suggest a next available meeting start and end time in the time field(s) 358 (e.g., "Oct 19 10:00 AM" in the "Start Time" field and "Oct 19 11:00 AM in the "End Time" field). The scheduling smart action 318B may determine the next available meeting start and end times based on the calendar schedule of the current user that initiated the smart action (e.g., John Smith from the authorized users 311A in FIG. 4B), on available scheduling information for the other authorized users (e.g., of Jane Doe and James Williams), a default time (e.g., two weeks in advance), and/or in any other suitable manner. Moreover, the scheduling smart action 318B may set up a virtual conference room (e.g., using a meeting application) and provide a link to the virtual conference room in the meeting "Location" field 360. However, it should be appreciated that, instead of a virtual conference room, the scheduling smart action 318B may determine a recent physical meeting location from the calendar schedule of the user that initiated the smart action and/or the other authorized users.

After generating the meeting invitation 352 in the calendar application 350, the meeting invitation 352 is automatically sent (e.g., via an email application) and a corresponding meeting 352' is inserted into the calendar 364 (e.g., the calendar of the user that initiated the smart action and/or the calendar of the meeting guests), as shown in FIG. 6B. The meeting 352' includes substantially the same information as the meeting invitation 352. For instance, the meeting 352' has a meeting "Title" field 354' including the meeting title (e.g., "Review 'MARKETING DRAFT'"); a meeting "Guests" field 356' including the guests (e.g., Jane Doe and James Williams); a meeting organizer field 357' including the meeting organizer (e.g., John Smith); a meeting time field 358' (e.g., "Thursday, October 19-10:00-11:00 AM");

and a meeting "Location" field 360' (e.g., "Virtual Conference Room"). In some instances, the scheduling smart action 318B may additionally reschedule such meeting 352' and/or send an updated meeting invitation 352 if one or more of the invitees declines the meeting invitation 352.

Thus, the only user input for generating and sending such meeting invitation 352 and inserting such meeting 352' into the calendar was the initial interaction with the scheduling smart action 318B from the first application. It should be appreciated that, as the meeting invitation 352 is automatically sent and/or the meeting 352' is automatically scheduled, without further interaction by the requesting user, the meeting invitation 352 and/or meeting 352' is/are not necessarily shown to the user before sending. In some instances, a confirmation of the meeting invitation 352 and/or meeting 352' being sent is provided to the requesting user. For instance, a pop-up window, a banner, and/or the like may temporarily appear on the user interface of the first application indicating that such meeting invitation 352 and/or meeting 352' has been sent. In one instance, an "undo" option may be provided with such confirmation. In some embodiments, the calendar application is part of the same productivity suite (e.g., the productivity suite 200) as the word processing application. However, in some instances, the calendar application may be external to the productivity suite of the word processing application.

Figure 7:
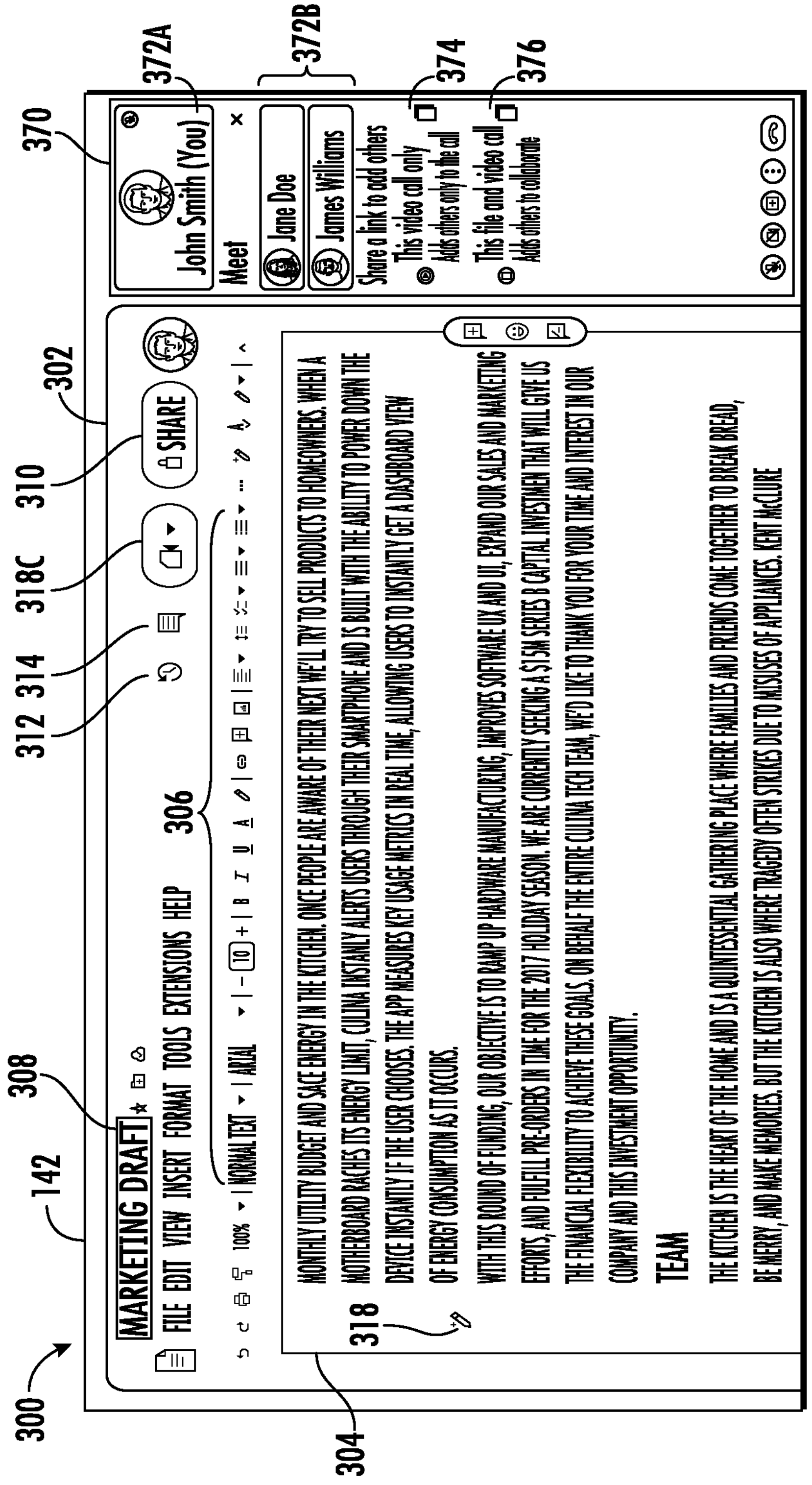
FIG. 7 depicts an illustration of an example meeting automatically initiated with another application based on an action initiated from the first application of the productivity suite illustrated in FIGS. 4A-4D according to example embodiments of the present disclosure.

Turning back to FIGS. 4C-4D, another example of a predefined smart action element includes a start-meeting smart action 318C (e.g., labeled "START MEETING WITH DOC USERS") accessible from the list provided from the smart action icon 318 and/or directly from the toolbar, which, when interacted with by a user, starts a meeting with the authorized users (e.g., the authorized users 311A in FIG. 4B). For instance, FIG. 7 depicts an illustration of an example meeting automatically initiated with another application based on the start-meeting smart action 318C initiated from the first application of the productivity suite illustrated in FIGS. 4A-4D according to example embodiments of the present disclosure. More particularly, a meeting window 370 of a meeting application may be provided alongside the workspace 304 of the object 302 of the first application (e.g., the word processing application). As shown in the meeting window 370, the meeting includes the user participant 372A that initiated the call (e.g., John Smith) and other participants 372B, particularly at least the other authorized users of the object 302 of the first application (e.g., authorized users 311A in FIG. 4B, Jane Doe and James Williams), which were automatically invited to the meeting and accepted the meeting. Additionally, the meeting may have options to invite other users to the meeting. For instance, the meeting window 370 includes a first option 374 to add further users to the meeting, but not to allow such further users to separately access and/or edit content within the object 302 of the first application. Similarly, the meeting window 370 includes a second option 376 to add further users to the meeting and give permission to the further users to access and/or edit content within the object 302 of the first application. In some instances, the meeting may be a pre-scheduled meeting which includes a link to the object 302, which is automatically found and initiated within the meeting window 370 at the scheduled time and/or upon interaction of the start-meeting smart action 318C. However, in other instances, the meeting may be a new meeting, not pre-scheduled.

As such, an initiating user does not need to manually invite the other authorized users to a meeting and/or a meeting with such authorized users does not need to be previously scheduled in order to automatically initiate such meeting. Thus, the only user input for initiating such meeting was the initial interaction with the start-meeting smart action 318C from the first application. Moreover, such meeting is initiated without having to navigate away from the object 302 of the first application. In some embodiments, the meeting application is part of the same productivity suite (e.g., the productivity suite 200) as the word processing application. However, in some instances, the meeting application may be external to the productivity suite of the word processing application. Moreover, the meeting or communication application may be configured to provide any combination of voice, video, and/or chat functions for the meeting participants.

Figure 8A:
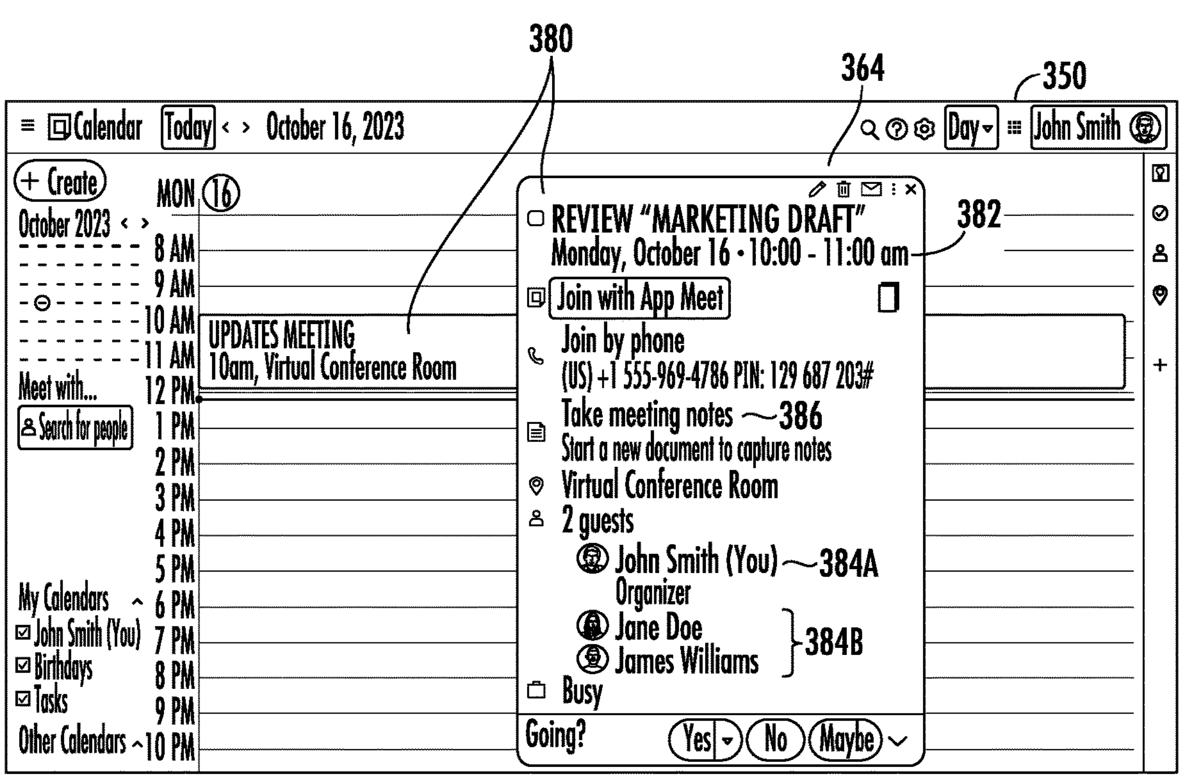
FIGS. 8A-8C depict an illustration of an example communication flow initiated with another application based on an action initiated from the first application of the productivity suite illustrated in FIGS. 4A-4D according to example embodiments of the present disclosure.
Figure 8B:
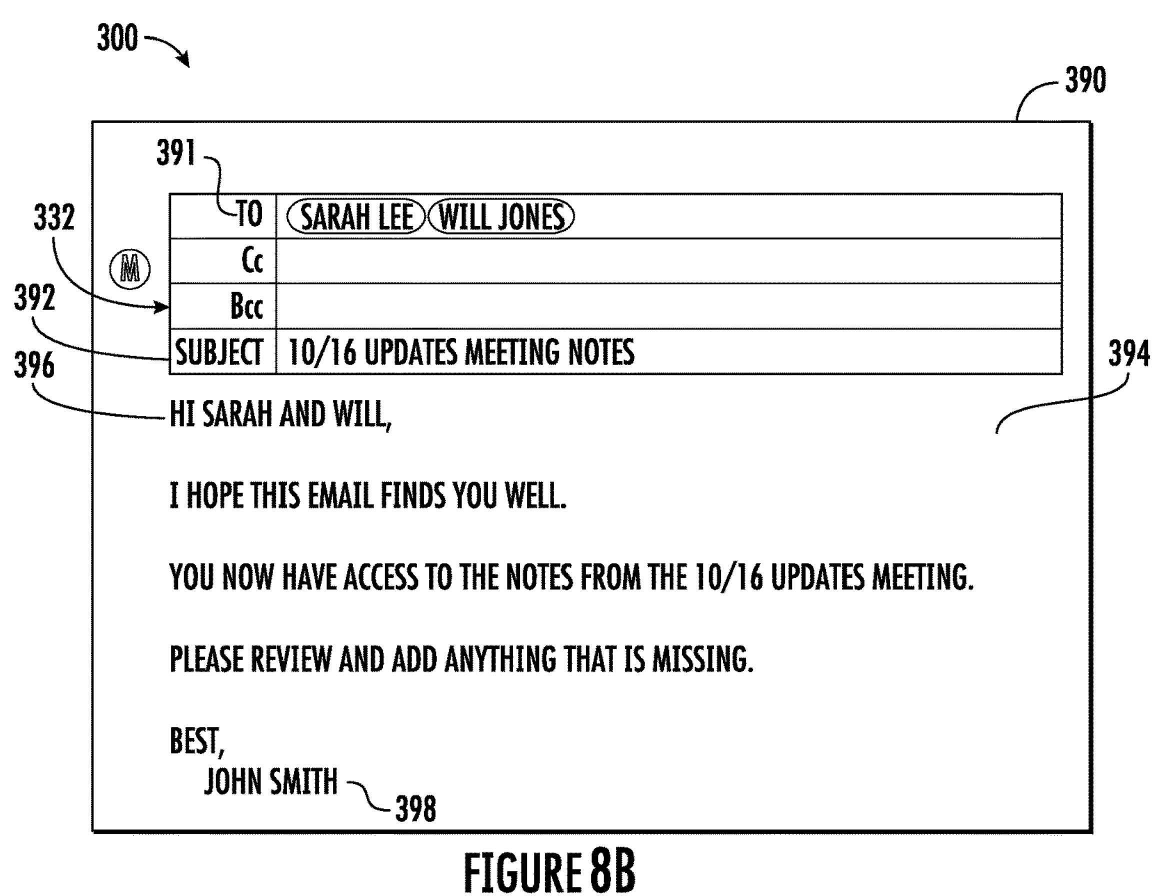
Figure 8C:
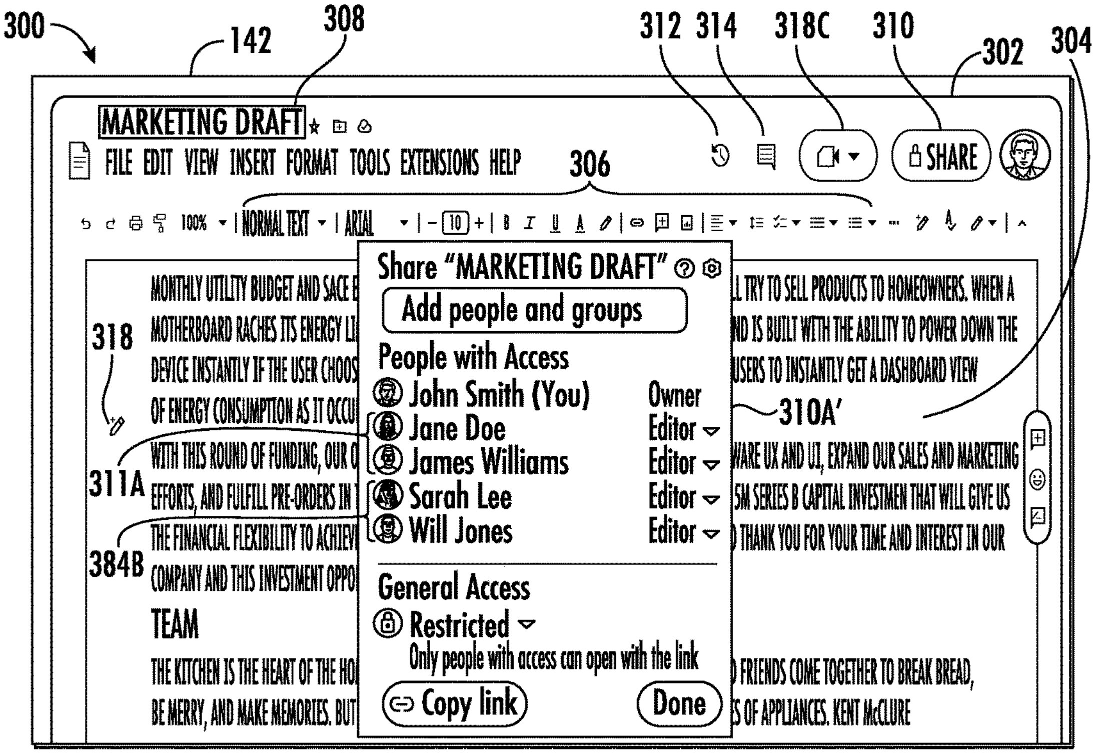

Turning back to FIGS. 4C-4D, another example of a predefined smart action element includes a meeting notes smart action 318D (e.g., labeled "ADD AS MEETING NOTES"), which, when interacted with by a user, provides the content of object 302 as meeting notes for a corresponding meeting. FIGS. 8A-8C depict an illustration of an example communication flow initiated with another application based on an action initiated from the first application of the productivity suite illustrated in FIGS. 4A-4D according to example embodiments of the present disclosure.

For instance, the object 302 may be associated with one or more timestamps indicating the time which the environment was created, last accessed, edited, and/or the like. After the meeting notes smart action 318D is initiated, the timestamp(s) may be used to find an existing meeting in a calendar application. For example, the timestamp(s) associated with the object 302 includes a time 10:05 AM on Monday, October 16$^{th}$. As such, an existing scheduled meeting in the calendar 364 of the user that initiated the meeting notes smart action 318D (e.g., John Smith) may be identified, such as the "Updates Meeting" 380 in FIG. 8A, scheduled on Monday, October 16$^{th}$ for a period from 10:00-11:00 AM, which includes the time of the timestamp (e.g., 10:05 AM). The identified meeting 380 includes the organizer 384A (e.g., John Smith) and the invited meeting participants 384B (e.g., Sarah Lee and Will Jones). As such, in some instances, an email 390 may be sent to the meeting participants 384B, as shown in FIG. 8B, using an email application (e.g., the email application used for FIG. 5). The email 390 may include the common fields 332 filled out in part using content from the object 302 and the identified meeting 380. For example, the meeting participants (e.g., Sarah Lee and Will Jones) are included in the "To" field 391 and in the greetings line 396, the identified meeting 380 is indicated in the "Subject" field 392 and in the body 394, and the organizer (e.g., John Smith) is indicated in the by-line field 398. Additionally, or alternatively, as shown in FIG. 8C, the meeting participants 384B (e.g., Sarah Lee and Will Jones) may be added as authorized users to the object 302, such as shown in the updated share window 310A' of the object 302, which is otherwise the same as the share window 310A in FIG. 4B. Moreover, in one or more instances, the meeting 380 in the calendar application may be updated to include a link to the object 302, such as in the meeting notes field 382 in FIG. 8A.

In some instances, the meeting participants are shared a defined portion of the object 302. For example, the defined portion may be one or more of takeaways, a summary, to-do list, important figures, and/or the like of the object 302. However, in some instances, the defined portion may be an entirety of the object 302.

As such, an initiating user does not need to manually find a meeting that corresponds to the object 302 and/or manually share the defined portion of the object 302 with the other meeting participants. Instead, the only user input for sharing the meeting notes was the initial interaction with the meeting notes smart action 318D from the first application. Moreover, such sharing is initiated without having to navigate away from the object 302 of the first application. It should be appreciated that, as the meeting notes are automatically sent upon interacting with the meeting notes smart action 318D, without further interaction by the requesting user, the email 390 and/or updated share window 310A' are not necessarily shown to the user before sending. In some instances, a confirmation of the email 390 being sent and/or confirmation of the updated share window 310A' is provided to the requesting user. For instance, a pop-up window, a banner, and/or the like may temporarily appear on the user interface of the first application indicating that such email 390 has been sent and/or that the meeting participants have been added in the updated share window 310A'. In one instance, an "undo" option may be provided with such confirmation. In some embodiments, the calendar application and/or email application may be part of the same productivity suite (e.g., the productivity suite 200) as the word processing application. However, in some instances, the calendar application and/or email application may be external to the productivity suite of the word processing application.

Turning back to FIGS. 4C-4D, the quick actions may additionally, or alternatively, include a field 318E for a user to input a description of an action to take. In one instance, the field 318E may allow a user to provide a freeform, natural language action request (e.g., text) which may be interpreted using machine-learning. In some instances, the field 318E may additionally, or alternatively, include multiple guided fields, such as drop-down menus of potential actions that may be taken, drop-down menus of applications with an action can be performed, and/or the like. The freeform action request may be similar to the predefined smart actions 318A, 318B, 318C, 318D described above. For example, the freeform action request may be "send email to document users to review updates," "schedule meeting with document users," "start meeting with document users," "add as meeting notes," "send these notes to the people in the meeting I'm in," "send takeaways and summary to meeting participants," and/or the like. As indicated above, such smart actions may provide confirmation of such automatic action being performed. In some instances, such smart actions may also provide an "undo" option with such confirmation.

In some instances, the smart actions 318A, 318B, 318C, 318D, 318E described herein may be associated with a smart trigger for performing the smart actions with the second application(s), other than directly interacting with one of the smart action elements, such as when a portion of the content associated with the first application matches a predefined condition. For instance, the email smart action 318A may be associated with an editing-based trigger. For example, the email 330 (FIG. 5) may be sent after a user has performed edits to the content within the workspace 304 of the object 302, such as after a user has closed out of the object 302 after making edits, after a certain time has elapsed since such edits, after a task (e.g., list item) is marked as completed, and/or the like. Similarly, the meeting scheduling smart action 318B may be associated with a comment-based trigger. For instance, if there is a certain number of comments with questions to authorized users of the object 302, the meeting invitation 352 in FIG. 6A may be sent and/or the meeting 352' in FIG. 6B may be scheduled. Similarly, if a comment is made that is associated with starting a conference (e.g., "Let's meet", "Let's discuss", and/or the like), a meeting may be started as in FIG. 7. As another example, if a calendar event and/or meeting invitation has the same time frame and/or includes the title of an integrated development environment, such as the object 302, the integrated development environment (or defined portions thereof) may be automatically added as meeting notes for the calendar event and shared with the attendees of the calendar event, as in FIGS. 8A-8C. Moreover, if a meeting is scheduled in a calendar application, a user may set a trigger for a certain time before the meeting starts (e.g., one hour) to send a reminder to the meeting participants to update their progress trackers, notes, etc. Such schedule trigger may be particularly useful if notes are tied to the meeting (e.g., notes are inserted as meeting notes in the calendar, the meeting has the notes title in the meeting name, the meeting participants are authorized users of the same integrated development environment with a similar title to the meeting, and/or the like). Such smart triggers may be pre-defined by the productivity suite, may be defined in settings of the productivity suite by the initiating user, may be automatically defined based on trends in a user's history for initiating the smart actions (e.g., using machine learning), and/or the like.

Additionally, users may need to perform the same set of tasks across different projects. For instance, when performing projects of a same type, there may be a plurality of steps that must take place at a certain stage that requires a user to perform the same inputs. For example, at the start of a project, the user may have to share a project overview, set up and share a set list of tasks based on the project overview, schedule an initial project launch meeting, open a chat space for the project, and/or schedule a regular follow up meeting. Later, during a review stage, a user may have to create and share a review rubric, schedule a review meeting, and/or the like. Further, after the review stage, the user may need to share the project with another team, which could require the user to individually click through each project document, chat space, and/or the like to share the project with the other team. A user could create templates for each of the tasks, but this would still require a user to find the individual templates and send them for each project.

As such, it should be appreciated that predefined smart actions, in addition to the ones described with reference to FIGS. 4A-8C, may be predefined by a user. For instance, as shown in FIGS. 4A and 4B, the list accessed using the smart action icon 318 and/or toolbar may further include an add smart action element 318F. However, the add smart action element 318F may instead be part of settings within one of the applications, such as the first application. Upon interacting with the add smart action element 318F, the user may indicate one or more actions to be initiated each time the new smart action being defined is interacted with. For instance, in some embodiments, the user may indicate the action(s) to be triggered by interacting with such new smart action using a freeform, natural language action request (e.g., text) which may be interpreted using machine-learning. In some instances, the user may additionally, or alternatively, indicate the action(s) to be triggered with such new smart action using one or more guided fields, such as one or more drop-down menus of potential actions that may be taken, one or more drop-down menus of applications with an action can be performed, and/or the like.

As an example, a user may open a new object (e.g., integrated development document environment) within a word-processing application, add authorized users to the integrated development environment, then interact with (e.g., click) on the add smart action element 318F. Thereafter, the user may indicate that the new predefined action to be created includes inserting a list of tasks, where the list of tasks may be dynamically generated from content within the integrated development environment or may be a preset list provided by the user. The user may indicate that the new predefined action to be created additionally, or alternatively, includes scheduling an initial project launch meeting and/or a regular meeting (e.g., once a week) with the authorized users. The user may indicate that the new predefined action to be created additionally, or alternatively, includes opening a chat space with the authorized users for the project. The user may indicate that the new predefined action to be created additionally, or alternatively, includes sharing a separate review rubric and/or the like with the authorized users. The user may indicate that the new predefined action to be created additionally, or alternatively, includes providing an input area for quick sharing the integrated development environment and each of the items linked with the integrated development environment (e.g., meetings, chat spaces, rubrics, and/or the like) with additional users, such as a freeform field for adding additional users (e.g., via email addresses, names, and/or the like).

After indicating the action(s) to be performed by interacting with the new smart action, a new element for the new smart action may be inserted into the first application, such as added to the list accessible from the smart action icon 318 and/or toolbar. In some instances, the new smart action may be accessible from any object (e.g., other integrated development environments) of such first application. As such, a user may also define multiple actions to be taken with a single interaction (e.g., click, condition-based trigger, and/or the like).

In particular embodiments, as in the examples provided above with respect to FIGS. 4A-8C, the smart action requests originate from an object of the first application configured as a document of a word-processing application. However, in some embodiments, an object of any other suitable starting application type may instead be used.

Example Methods

Figure 9:
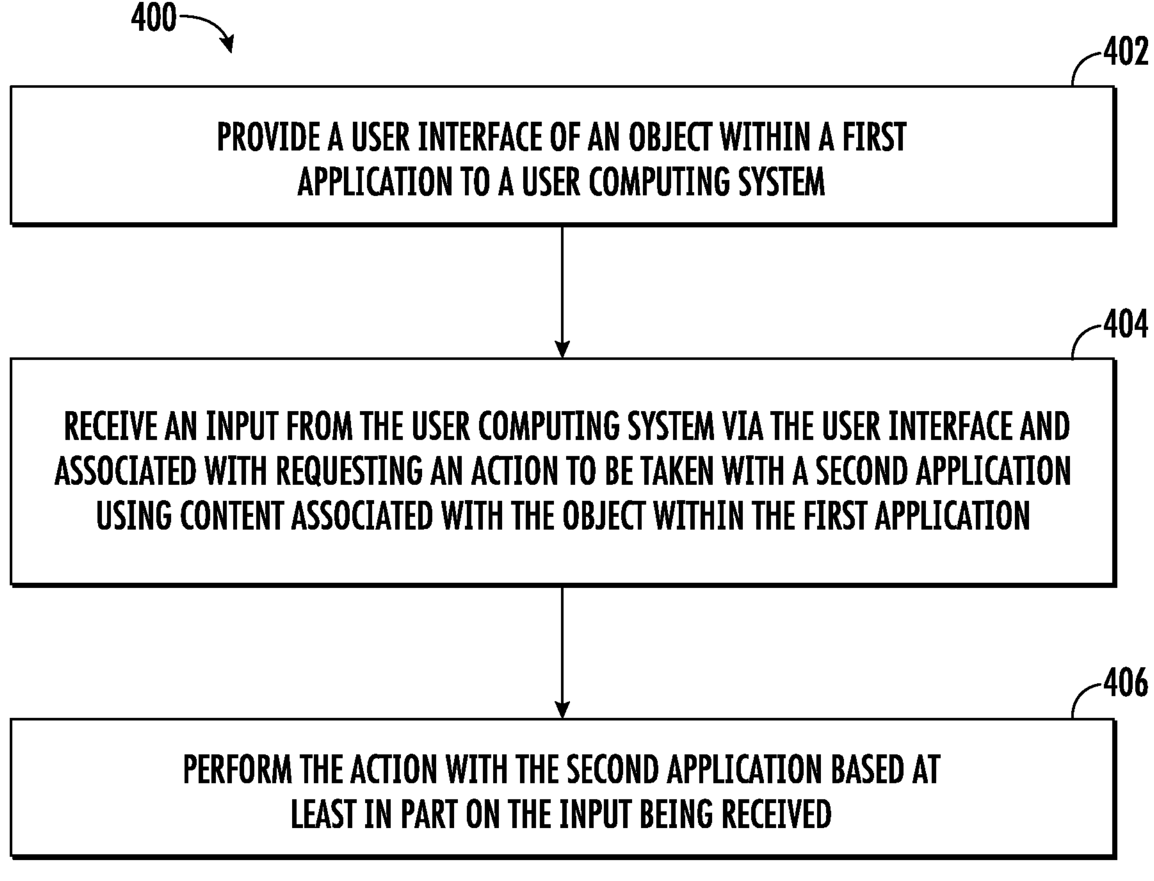
FIG. 9 depicts a flow chart diagram of an example method for automating actions across applications according to example embodiments of the present disclosure.

FIG. 9 depicts a flow chart diagram of an example method 400 to automate actions across applications according to example embodiments of the present disclosure. Although FIG. 9 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a computing system provides a user interface of an object within a first application to a user computing system. For instance, as discussed above, a user interface, such as the user interface 142, can provide an object 302 such as the integrated development environment of a document within a word processing application, as shown in FIG. 4A. The integrated development environment may be an online word processor file, stored or hosted on a server (e.g., server 130) and accessible by a user computing device (e.g., user computing device 102), or may be stored or hosted on a user computing device and have communication with a server. The object 302 may allow multiple user computing device(s) 102 to access the workspace 304 simultaneously to allow for simultaneous or collaborative editing of content within the workspace 304.

At 404, the computing system receives an input from the user computing system via the user interface and being associated with requesting an action to be taken with a second application using content associated with the object of the first application. For example, as described above, the computing system may receive an input from the user computing system, such as by direct interaction with one or more of the smart actions 318A, 318B, 318C, 318D, 318E, where such interaction(s) are associated with a predefined action to be taken with a second application (e.g., email application, meeting application, calendar application, and/or the like), and/or indirectly, when content associated with the integrated development environment of the first application matches a predefined trigger. Particularly, the action may include using content associated with the object 302 of the first application, such as the title or name of the object 302, the authorized users of the object 302, content existing within the workspace 304 of the object 302, and/or the like.

At 406, the computing system performs the action with the second application based at least in part on the input being received. For instance, as described above, the computing system may automatically perform the action with the second application, without further input from the user requesting the action.

As such, a user does not need to navigate away from one application to perform an action with another application, which significantly reduces the time and computing resources involved with performing tasks across applications.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for automating actions across applications, the computing system comprising:

one or more processors; and one or more non-transitory computer-readable media that collectively store instructions that, when executed by the one or more processors, cause the computing system to perform operations, the operations comprising:

providing a user interface of an object within a first application to a user computing system;

receiving an input from the user computing system via the user interface, the input requesting an action to be taken with a second application;

identifying, using a machine-learning model, relevant content associated with the object within the first application based at least in part on the action requested; and performing the action with the second application by automatically generating, using the machine-learning model, a second object within the second application based at least in part on the input being received and the relevant content, wherein performing the action comprises performing the action without navigating the user computing system away from the user interface of the object within the first application.

2. The computing system of claim 1, wherein the machine-learning model is configured to identify the relevant content associated with the object within the first application by at least identifying a plurality of users associated with the object.

3. The computing system of claim 2, wherein the second application comprises a communication application, wherein the action comprises opening a conversation within the communication application with the plurality of users, and wherein the second object is a message such that performing the action with the second application comprises automatically generating the message based at least in part on the action requested, the message being provided within a user interface for the conversation within the communication application with the plurality of users.

4. The computing system of claim 2, wherein the second application comprises a calendar application, wherein the action comprises scheduling a new meeting within the calendar application with the plurality of users, and wherein performing the action with the second application comprises automatically generating a message based at least in part on the action requested and providing a calendar event for the new meeting within the calendar application to the plurality of users, the calendar event including the message.

5. The computing system of claim 1, wherein the machine-learning model is configured to identify the relevant content associated with the object by identifying a timestamp associated with editing within the object, and wherein the action comprises automatically generating the second object within the second application, the second object providing a defined portion within the object to attendees of a meeting scheduled within a calendar for a period including the timestamp.

6. The computing system of claim 5, wherein the second application comprises a communication application, wherein the second object is a message such that performing the action with the second application comprises automatically generating the message based at least in part on the action requested, the message being provided within the second object to the attendees of the meeting with the communication application.

7. The computing system of claim 1, wherein receiving the input comprises receiving a click on a predefined element accessible within the object, the predefined element being associated with requesting the action.

8. The computing system of claim 7, wherein the operations further comprise:

receiving an input from the user computing system via the user interface associated with a request to define a new element accessible from within the first application;

receiving an input from the user computing system via the user interface defining the action to be triggered by clicking the new element; and inserting the new element into the first application, the new element being the predefined element, wherein the new element is accessible from the object and any other object within the first application.

9. The computing system of claim 8, wherein the input associated with the request to define the new element is received via a freeform field, and wherein the operations further comprise interpreting, with the machine-learning model, the input associated with the request to define the new element to identify the action to be triggered by clicking the new element.

10. The computing system of claim 1, wherein the input is associated with requesting the action be automatically taken with the second application using the relevant content associated with the object when a portion of the relevant content matches a predefined condition, and wherein performing the action with the second application based at least in part on the input being received comprises automatically performing the action with the second application when the input received is received and when the portion of the relevant content matches the predefined condition.

11. The computing system of claim 1, wherein the input requesting the action to be taken with the second application implicitly defines the second application, wherein the operations further comprises:

identifying, using the machine-learning model, the second application based at least in part on the action requested and the second application and the first application being hosted by a same productivity suite.

12. A computer-implemented method for automating actions across applications, the method comprising:

providing, by a computing system, a user interface of an object within a first application to a user computing system;

receiving, by the computing system, an input from the user computing system via the user interface, the input requesting an action to be taken with a second application;

identifying, by the computing system using a machine-learning model, relevant content associated with the object within the first application based at least in part on the action requested; and performing, by the computing system, the action with the second application by automatically generating, using the machine-learning model, a second object within the second application based at least in part on the input being received and the relevant content, wherein performing the action comprises performing the action without navigating the user computing system away from the user interface of the object within the first application.

13. The computer-implemented method of claim 12, wherein the machine-learning model is configured to identify the relevant content associated with the object within the first application by at least identifying a plurality of users associated with the object.

14. The computer-implemented method of claim 13, wherein the second application comprises a communication application, wherein the action comprises opening a conversation within the communication application with the plurality of users, and wherein the second object is a message such that performing the action with the second application comprises automatically generating the message based at least in part on the action requested, the message being provided within a user interface for the conversation within the communication application with the plurality of users.

15. The computer-implemented method of claim 13, wherein the second application comprises a calendar application, wherein the action comprises scheduling a new meeting within the calendar application with the plurality of users, and wherein performing the action with the second application comprises automatically generating a message based at least in part on the action requested and providing a calendar event for the new meeting within the calendar application to the plurality of users, the calendar event including the message.

16. The computer-implemented method of claim 12, wherein the machine-learning model is configured to identify the relevant content associated with the object by identifying a timestamp associated with editing within the object, and wherein the action comprises automatically generating the second object within the second application, the second object providing a defined portion within the object to attendees of a meeting scheduled within a calendar for a period including the timestamp.

17. The computer-implemented method of claim 16, wherein the second application comprises a communication application, wherein the second object is a message such that performing the action with the second application comprises automatically generating the message based at least in part on the action requested, the message being provided within the second object to the attendees of the meeting with the communication application.

18. One or more non-transitory computer-readable media that collectively store instructions that, when executed by one or more computing devices, cause the one or more computing devices to perform operations, the operations comprising:

providing a user interface of an object within a first application to a user computing system;

receiving an input from the user computing system via the user interface, the input requesting an action to be taken with a second application;

identifying, using a machine-learning model, relevant content associated with the object within the first application based at least in part on the action requested; and performing the action with the second application by automatically generating, using the machine-learning model, a second object within the second application based at least in part on the input being received and the relevant content, wherein performing the action comprises performing the action without navigating the user computing system away from the user interface of the object within the first application.

19. The one or more non-transitory computer-readable media of claim 18, wherein the machine-learning model is configured to identify the relevant content associated with the object within the first application by at least identifying a plurality of users associated with the object.

20. The one or more non-transitory computer-readable media of claim 19, wherein the second application comprises a communication application, wherein the action comprises opening a conversation within the communication application with the plurality of users, and wherein the second object is a message such that performing the action with the second application comprises automatically generating the message based at least in part on the action requested, the message being provided within a user interface for the conversation within the communication application with the plurality of users.

* * * * *